(12) United States Patent
Gula, IV

(10) Patent No.: US 7,818,225 B2
(45) Date of Patent: Oct. 19, 2010

(54) FINANCIAL INSTRUMENT AND RELATED BUSINESS METHOD

(75) Inventor: John Gula, IV, Ballston Lake, NY (US)

(73) Assignee: Excel Ventures LLC, Schenectady, NY (US)

( * ) Notice: Subject to any disclaimer, the term of this patent is extended or adjusted under 35 U.S.C. 154(b) by 1527 days.

(21) Appl. No.: 10/995,790

(22) Filed: Nov. 23, 2004

(65) Prior Publication Data

US 2005/0114260 A1 May 26, 2005

Related U.S. Application Data

(60) Provisional application No. 60/525,518, filed on Nov. 26, 2003.

(51) Int. Cl.
*G06Q 40/00* (2006.01)
(52) U.S. Cl. .......................................... 705/35; 705/36
(58) Field of Classification Search .............. 705/35–39
See application file for complete search history.

(56) References Cited

U.S. PATENT DOCUMENTS

| 5,742,775 | A | 4/1998 | King |
| 7,024,384 | B2 * | 4/2006 | Daughtery, III ........... 705/36 R |
| 2001/0039500 | A1 * | 11/2001 | Johnson ......................... 705/1 |
| 2005/0004857 | A1 * | 1/2005 | Schwarz et al. ............... 705/36 |

OTHER PUBLICATIONS

Office Action (Mail Date Mar. 4, 2010) for U.S. Appl. No. 11/834,920, filed Aug. 7, 2007, Confirmation No. 1511.
Dhaliwal et al.; "Is a dividend tax penalty incorporated into the return on a firm's common stock?", Jun. 2003, Journal of Accounting and Economics vol. 35, Issue 2; pp. 155-178.

* cited by examiner

*Primary Examiner*—Thu Thao Havan
(74) *Attorney, Agent, or Firm*—Schmeiser, Olsen & Watts, LLP

(57) ABSTRACT

A financial instrument of an entity and a related business method. The financial instrument includes: a conventional investment instrument; a penalty feature added to the conventional investment instrument; and a dividend feature added to the conventional investment instrument. The penalty feature is characterized by a penalty assessed against a holder of at least one share of the financial instrument who sells the at least one share on a date of sale that precedes an extinguish date associated with the financial instrument. The dividend feature is characterized by a dividend adapted to be distributed, on a date subsequent to the date of sale, to all Holders of Record of the financial instrument on the date of sale. The dividend is derived from the penalty. The financial instrument is adapted to be acquired by a plurality of investors.

40 Claims, 37 Drawing Sheets

T - Accounts Table

| | T - Accounts | |
|---|---|---|
| | Issuing Company Typical Accounting | Investor Accounting |
| TIME = 1 | A. | B. |
| | | Debit | Credit | | Debit | Credit |
| | Investor#1 Transaction | | | Investor#1 | | |
| | Cash | $ 200.00 | | Cash | | $ 200.00 |
| | R-Share Stock | | 200.00 | R-Share Stock | $ 200.00 | |
| | Investor#2 Transaction | | | Investor#2 | | |
| | Cash | 400.00 | | Cash | | 400.00 |
| | R-Share Stock | | 400.00 | R-Share Stock | 400.00 | |
| | Investor#3 Transaction | | | Investor#3 | | |
| | Cash | 300.00 | | Cash | | 300.00 |
| | R-Share Stock | | 300.00 | R-Share Stock | 300.00 | |
| TIME = 2 | C. | D. |
| | | Debit | Credit | | Debit | Credit |
| | Investor#1 Transaction | | | Investor#1 | | |
| | Cash | | 190.00 | Cash | 190.00 | |
| | R-Dividend Escrow Acct | 20.00 | | R-Share Stock | | 190.00 |
| | R-Dividend Payable | | 20.00 | | | |
| | R-Share Stock | 190.00 | | | | |
| | Investor#4 Transaction | | | Investor#4 | | |
| | Cash | 210.00 | | Cash | | 210.00 |
| | R-Share Stock | | 210.00 | R-Share Stock | 210.00 | |
| TIME = 3 | E. | F. |
| | | Debit | Credit | | Debit | Credit |
| | Investor#2 & 3 Transactions | | | Investor#2 | | |
| | R-Dividend Escrow Acct | | 20.00 | Cash | 11.43 | |
| | Investor#2 Transaction | | | R-Dividend Recievable | | 11.43 |
| | R-Dividend Payable | 11.43 | | Investor#3 | | |
| | Investor#3 Transaction | | | Cash | 8.57 | |
| | R-Dividend Payable | 8.57 | | R-Dividend Recievable | | 8.57 |

*FIG. 2*

Example of R-Shares Purchases, Liquidation and Dividends Paid and Received

| | TIME 1 | TIME 2 | TIME 3 | TIME 4 | TIME 5 | TIME 6 | TIME 7 | TIME 8 |
|---|---|---|---|---|---|---|---|---|
| SHARE PRICE | $ 20.00 | $ 21.00 | $ 22.00 | $ 23.00 | $ 24.00 | $ 25.00 | $ 26.00 | $ 27.00 |
| TOTAL SHARES OWNED AT END OF DAY | | | | | | | | |
| INVESTOR 1 | 10 | | | | | | | |
| INVESTOR 2 | 20 | 20 | 20 | | | | | |
| INVESTOR 3 | 15 | 15 | 15 | 15 | | | | |
| INVESTOR 4 | | 10 | 10 | 10 | 10 | 10 | 10 | 10 |
| INVESTOR 5 | | | | 20 | 20 | 20 | | |
| INVESTOR 6 | | | | | 5 | 5 | | |
| INVESTOR 7 | | | | | 10 | 10 | | |
| INVESTOR 8 | | | | | | | 15 | 15 |
| INVESTOR 9 | | | | | | | 10 | 10 |
| INVESTOR 10 | | | | | | | 10 | 10 |
| TOTAL | 45 | 45 | 45 | 45 | 45 | 45 | 45 | 45 |
| TOTAL STOCK VALUE | | | | | | | | |
| INVESTOR 1 | 200 | | | | | | | |
| INVESTOR 2 | 400 | 420 | 440 | | | | | |
| INVESTOR 3 | 300 | 315 | 330 | 345 | | | | |
| INVESTOR 4 | | 210 | 220 | 230 | 240 | 250 | 260 | 270 |
| INVESTOR 5 | | | | 460 | 480 | 500 | | |
| INVESTOR 6 | | | | | 120 | 125 | | |
| INVESTOR 7 | | | | | 240 | 250 | | |
| INVESTOR 8 | | | | | | | 390 | 405 |
| INVESTOR 9 | | | | | | | 260 | 270 |
| INVESTOR 10 | | | | | | | 260 | 270 |
| HOLDERS OF RECORD END OF DAY | | | | | | | | |
| INVESTOR 1 | 10 | | | | | | | |
| INVESTOR 2 | 20 | 20 | 20 | | | | | |
| INVESTOR 3 | 15 | 15 | 15 | 15 | | | | |
| INVESTOR 4 | | | 10 | 10 | 10 | 10 | 10 | 10 |
| INVESTOR 5 | | | | | 20 | 20 | | |
| INVESTOR 6 | | | | | | 5 | | |
| INVESTOR 7 | | | | | | 10 | | |
| INVESTOR 8 | | | | | | | | 15 |
| INVESTOR 9 | | | | | | | | 10 |
| INVESTOR 10 | | | | | | | | 10 |
| TOTAL HOLDERS ON RECORD | 45 | 35 | 45 | 25 | 30 | 45 | 10 | 45 |
| R-PENALTIES DUE FROM INVESTOR SALE @ 10% | | | | | | | | |
| INVESTOR 1 | | 20.00 | | | | | | |
| INVESTOR 2 | | | | 44.00 | | | | |
| INVESTOR 3 | | | | | 34.50 | | | |
| INVESTOR 4 | | | | | | | | |
| INVESTOR 5 | | | | | | | 50.00 | |
| INVESTOR 6 | | | | | | | 12.50 | |
| INVESTOR 7 | | | | | | | 25.00 | |
| INVESTOR 8 | | | | | | | | |
| INVESTOR 9 | | | | | | | | |
| INVESTOR 10 | | | | | | | | |
| TOTAL R-PENALTIES DUE | 0.00 | 20.00 | 0.00 | 44.00 | 34.50 | 0.00 | 87.50 | 0.00 |
| TOTAL HOLDERS OF RECORD | 45 | 35 | 45 | 25 | 30 | 45 | 10 | 45 |
| R-PENALTIES / SHARE DUE | $ - | $ 0.571 | $ - | $ 1.76 | $ 1.15 | $ - | $ 8.75 | $ - |
| R-DIVIDEND PAID TO EACH R- SHAREHOLDER OF RECORD | | | | | | | | |
| INVESTOR 1 | | | | | | | | |
| INVESTOR 2 | | | 11.43 | | | | | |
| INVESTOR 3 | | | 8.57 | | 26.40 | | | |
| INVESTOR 4 | | | | | 17.60 | | 11.50 | 87.50 |
| INVESTOR 5 | | | | | | | 23.00 | |
| INVESTOR 6 | | | | | | | | |
| INVESTOR 7 | | | | | | | | |
| INVESTOR 8 | | | | | | | | |
| INVESTOR 9 | | | | | | | | |
| INVESTOR 10 | | | | | | | | |

*FIG. 3*

Balance Sheet Comparisions - Conventional & R-Share Using

| BALANCE SHEET COMPARISON | | |
|---|---|---|
| ACCOUNT | R-SHARE COMPANY | CONVENTIONAL COMPANY |
| Current Assets | | |
| Cash and cash equivalents | $20,000 | $10,000 |
| R-Share Dividend Escrow Account | 50,000 | N/A |
| Accounts receivable | 35,000 | 35,000 |
| Inventory | 25,000 | 25,000 |
| Total Current Assets | 130,000 | 70,000 |
| Plant and machinery | 20,000 | 20,000 |
| Less depreciation | -12,000 | -12,000 |
| Land | 8,000 | 8,000 |
| Intangible Assets | 2,000 | 2,000 |
| Total Assets | $148,000 | $88,000 |
| Liabilities and Shareholders Equity | | |
| R-Share Dividend Payable | 50,000 | N/A |
| Accounts payable | $20,000 | $20,000 |
| Taxes payable | 5,000 | 5,000 |
| Long-term bonds issued | 15,000 | 15,000 |
| Total Liabiliites | 90,000 | 40,000 |
| Common Stock | 40,000 | 40,000 |
| R-Share Stock | 10,000 | N/A |
| Retained Earnings | 8,000 | 8,000 |
| Total Shareholders Equity | 58,000 | 48,000 |
| Total Liabilities and Shareholders Equity | $148,000 | $88,000 |

*FIG. 4*

Income Statement Comparisions - Conventional & R-Share Using

| INCOME SHEET COMPARISON | | |
|---|---|---|
| ACCOUNT | R-SHARE COMPANY | CONVENTIONAL COMPANY |
| Sales | $1,000,000 | $1,000,000 |
| Less Cost of Goods Sold | -250,000 | -250,000 |
| Gross Profit on Sales | 750,000 | 750,000 |
| Less General Operating Expenses | -125,000 | -125,000 |
| Less Depreciation Expense | -25,000 | -25,000 |
| Operating Income | 600,000 | 600,000 |
| Other Income | 45,000 | 45,000 |
| Earnings Before Interest and Tax | 645,000 | 645,000 |
| Less Interest Expense | -35,000 | -35,000 |
| Less Taxes | -60,000 | -60,000 |
| Net Earnings (Available Earnings for Dividends) | 550,000 | 550,000 |
| Less Common and/or Preferred Dividends Paid | -50,000 | -100,000 |
| Retained Earnings | $500,000 | $450,000 |
| Cummulated R-Dividends Paid in Fiscal Year | 100,000 | N/A |
| Net Dividend Income Paid to Shareholders | 150,000 | 100,000 |

*FIG. 5*

Financial Simulation with Decreasing Share Values: R-Penalty = 0%

CONVENTIONAL STOCK AND DECREASING SHARE PRICE

| R-PENALTY % | 0.0% | | | | 0.0% | | | | 0.0% | | | | 0.0% | | | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 975,000 | 950,000 | 925,000 | 900,000 | 875,000 | 850,000 | 825,000 | 800,000 | 775,000 | 750,000 | 725,000 | 700,000 | 675,000 | 650,000 | 625,000 | 600,000 |
| Price/Share | 20.00 | 19.00 | 18.00 | 17.00 | 16.00 | 15.00 | 14.00 | 13.00 | 12.00 | 11.00 | 10.00 | 9.00 | 8.00 | 7.00 | 6.00 | 5.00 | 4.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| R-Penalty Pool | 0 | 0 | 0 | 0 | 0 | 0 | 0 | 0 | 0 | 0 | 0 | 0 | 0 | 0 | 0 | 0 | 0 |
| R-Penalty/Holder of Record | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 190.00 | 180.00 | 170.00 | 160.00 | 150.00 | 140.00 | 130.00 | 120.00 | 110.00 | 100.00 | 90.00 | 80.00 | 70.00 | 60.00 | 50.00 | 40.00 |
| R-Penalty Dividend Received | N/A | N/A | N/A | N/A | N/A | N/A | N/A | N/A | N/A | N/A | N/A | N/A | N/A | N/A | N/A | N/A | N/A |
| Value at end of Period | 200.00 | 190.00 | 180.00 | 170.00 | 160.00 | 150.00 | 140.00 | 130.00 | 120.00 | 110.00 | 100.00 | 90.00 | 80.00 | 70.00 | 60.00 | 50.00 | 40.00 |
| Cumulative R-Dividend | N/A | N/A | N/A | N/A | N/A | N/A | N/A | N/A | N/A | N/A | N/A | N/A | N/A | N/A | N/A | N/A | N/A |
| Taxes on R-Dividends @5% | N/A | N/A | N/A | N/A | N/A | N/A | N/A | N/A | N/A | N/A | N/A | N/A | N/A | N/A | N/A | N/A | N/A |
| Gain (Loss) To Date | - | (10.00) | (20.00) | (30.00) | (40.00) | (50.00) | (60.00) | (70.00) | (80.00) | (90.00) | (100.00) | (110.00) | (120.00) | (130.00) | (140.00) | (150.00) | (160.00) |
| Loss Tax Credit @ 28% | - | 2.80 | 5.60 | 8.40 | 11.20 | 14.00 | 16.80 | 19.60 | 22.40 | 25.20 | 28.00 | 30.80 | 33.60 | 36.40 | 39.20 | 42.00 | 44.80 |
| R-Penalty at sale | N/A | N/A | N/A | N/A | N/A | N/A | N/A | N/A | N/A | N/A | N/A | N/A | N/A | N/A | N/A | N/A | N/A |
| Cumulative Value | 200.00 | 192.80 | 185.60 | 178.40 | 171.20 | 164.00 | 156.80 | 149.60 | 142.40 | 135.20 | 128.00 | 120.80 | 113.60 | 106.40 | 99.20 | 92.00 | 84.80 |

*FIG. 6A*

Financial Simulation with Decreasing Share Values: R-Penalty = 10%

FLAT R-PENALTY RATE AND DECREASING R-SHARE PRICE

| R-PENALTY % | | 10.0% | | | | | 10.0% | | | | | 10.0% | | | | | 10.0% | |
|---|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 975,000 | 950,000 | 925,000 | 900,000 | 875,000 | 850,000 | 825,000 | 800,000 | 775,000 | 750,000 | 725,000 | 700,000 | 675,000 | 650,000 | 625,000 | 600,000 |
| Price/Share | 20.00 | 19.00 | 18.00 | 17.00 | 16.00 | 15.00 | 14.00 | 13.00 | 12.00 | 11.00 | 10.00 | 9.00 | 8.00 | 7.00 | 6.00 | 5.00 | 4.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 2.00 | 1.90 | 1.80 | 1.70 | 1.60 | 1.50 | 1.40 | 1.30 | 1.20 | 1.10 | 1.00 | 0.90 | 0.80 | 0.70 | 0.60 | 0.50 |
| R-Penalty Pool | 0 | 200000 | 190000 | 180000 | 170000 | 160000 | 150000 | 140000 | 130000 | 120000 | 110000 | 100000 | 90000 | 80000 | 70000 | 60000 | 50000 |
| R-Penalty/Holder of Record | 0.000 | 0.228 | 0.222 | 0.216 | 0.210 | 0.203 | 0.196 | 0.189 | 0.181 | 0.172 | 0.163 | 0.153 | 0.143 | 0.132 | 0.120 | 0.107 | 0.093 |
| | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 190.00 | 180.00 | 170.00 | 160.00 | 150.00 | 140.00 | 130.00 | 120.00 | 110.00 | 100.00 | 90.00 | 80.00 | 70.00 | 60.00 | 50.00 | 40.00 |
| R-Penalty Dividend Received | 0.00 | 2.28 | 2.22 | 2.16 | 2.10 | 2.03 | 1.96 | 1.89 | 1.81 | 1.72 | 1.63 | 1.53 | 1.43 | 1.32 | 1.20 | 1.07 | 0.93 |
| Value at end of Period | 200.00 | 192.28 | 182.22 | 172.16 | 162.10 | 152.03 | 141.96 | 131.89 | 121.81 | 111.72 | 101.63 | 91.53 | 81.43 | 71.32 | 61.20 | 51.07 | 40.93 |
| Cumulative R-Dividend | 0.00 | 2.28 | 4.50 | 6.66 | 8.76 | 10.79 | 12.75 | 14.64 | 16.45 | 18.17 | 19.80 | 21.33 | 22.76 | 24.07 | 25.27 | 26.34 | 27.26 |
| Taxes on R-Dividends @5% | 0.00 | -0.11 | -0.23 | -0.33 | -0.44 | -0.54 | -0.64 | -0.73 | -0.82 | -0.91 | -0.99 | -1.07 | -1.14 | -1.20 | -1.26 | -1.32 | -1.36 |
| Gain (Loss) To Date | - | (10.00) | (20.00) | (30.00) | (40.00) | (50.00) | (60.00) | (70.00) | (80.00) | (90.00) | (100.00) | (110.00) | (120.00) | (130.00) | (140.00) | (150.00) | (160.00) |
| Loss Tax Credit @28% | - | 2.80 | 5.60 | 8.40 | 11.20 | 14.00 | 16.80 | 19.60 | 22.40 | 25.20 | 28.00 | 30.80 | 33.60 | 36.40 | 39.20 | 42.00 | 44.80 |
| R-Penalty at sale | (20.00) | (19.00) | (18.00) | (17.00) | (16.00) | (15.00) | (14.00) | (13.00) | (12.00) | (11.00) | (10.00) | (9.00) | (8.00) | (7.00) | (6.00) | (5.00) | (4.00) |
| Cumulative Value | 180.00 | 175.97 | 171.88 | 167.73 | 163.52 | 159.25 | 154.92 | 150.51 | 146.02 | 141.46 | 136.81 | 132.06 | 127.22 | 122.27 | 117.21 | 112.02 | 106.70 |

*FIG. 6B*

Financial Simulation with Decreasing Share Values: R-Penalty = 20%

FLAT R-PENALTY RATE AND DECREASING R-SHARE PRICE

| R-PENALTY % | 20.0% | | | | | 20.0% | | | | 20.0% | | | | 20.0% | | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 975,000 | 950,000 | 925,000 | 900,000 | 875,000 | 850,000 | 825,000 | 800,000 | 775,000 | 750,000 | 725,000 | 700,000 | 675,000 | 650,000 | 625,000 | 600,000 |
| Price/Share | 20.00 | 19.00 | 18.00 | 17.00 | 16.00 | 15.00 | 14.00 | 13.00 | 12.00 | 11.00 | 10.00 | 9.00 | 8.00 | 7.00 | 6.00 | 5.00 | 4.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 4.00 | 3.80 | 3.60 | 3.40 | 3.20 | 3.00 | 2.80 | 2.60 | 2.40 | 2.20 | 2.00 | 1.80 | 1.60 | 1.40 | 1.20 | 1.00 |
| R-Penalty Pool | 0 | 400000 | 380000 | 360000 | 340000 | 320000 | 300000 | 280000 | 260000 | 240000 | 220000 | 200000 | 180000 | 160000 | 140000 | 120000 | 100000 |
| R-Penalty/Holder of Record | 0.000 | 0.456 | 0.444 | 0.432 | 0.420 | 0.406 | 0.392 | 0.377 | 0.361 | 0.344 | 0.326 | 0.307 | 0.286 | 0.263 | 0.239 | 0.213 | 0.185 |
| | 0 | 0 | 0 | 0 | 0 | 0 | 0 | 0 | 0 | 0 | 0 | 0 | 0 | 0 | 0 | 0 | 0 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 190.00 | 180.00 | 170.00 | 160.00 | 150.00 | 140.00 | 130.00 | 120.00 | 110.00 | 100.00 | 90.00 | 80.00 | 70.00 | 60.00 | 50.00 | 40.00 |
| R-Penalty Dividend Received | 0.00 | 4.56 | 4.44 | 4.32 | 4.20 | 4.06 | 3.92 | 3.77 | 3.61 | 3.44 | 3.26 | 3.07 | 2.86 | 2.63 | 2.39 | 2.13 | 1.85 |
| Value at end of Period | 200.00 | 194.56 | 184.44 | 174.32 | 164.20 | 154.06 | 143.92 | 133.77 | 123.61 | 113.44 | 103.26 | 93.07 | 82.86 | 72.63 | 62.39 | 52.13 | 41.85 |
| Cumulative R-Dividend | 0.00 | 4.56 | 9.00 | 13.33 | 17.52 | 21.59 | 25.51 | 29.28 | 32.89 | 36.33 | 39.59 | 42.66 | 45.51 | 48.15 | 50.54 | 52.67 | 54.53 |
| Taxes on R-Dividends @5% | 0.00 | -0.23 | -0.45 | -0.67 | -0.88 | -1.08 | -1.28 | -1.46 | -1.64 | -1.82 | -1.98 | -2.13 | -2.28 | -2.41 | -2.53 | -2.63 | -2.73 |
| Gain (Loss) To Date | - | (10.00) | (20.00) | (30.00) | (40.00) | (50.00) | (60.00) | (70.00) | (80.00) | (90.00) | (100.00) | (110.00) | (120.00) | (130.00) | (140.00) | (150.00) | (160.00) |
| Loss Tax Credit @ 28% | - | 2.80 | 5.60 | 8.40 | 11.20 | 14.00 | 16.80 | 19.60 | 22.40 | 25.20 | 28.00 | 30.80 | 33.60 | 36.40 | 39.20 | 42.00 | 44.80 |
| R-Penalty at sale | (40.00) | (38.00) | (36.00) | (34.00) | (32.00) | (30.00) | (28.00) | (26.00) | (24.00) | (22.00) | (20.00) | (18.00) | (16.00) | (14.00) | (12.00) | (10.00) | (8.00) |
| Cumulative Value | 160.00 | 159.13 | 158.15 | 157.06 | 155.85 | 154.51 | 153.03 | 151.42 | 149.65 | 147.72 | 145.61 | 143.32 | 140.84 | 138.14 | 135.21 | 132.04 | 128.60 |

*FIG. 6C*

Financial Simulation with Decreasing Share Values: R-Penalty = 30%

FLAT R-PENALTY RATE AND DECREASING R-SHARE PRICE

| R-PENALTY % | | 30.0% | | | | | 30.0% | | | | 30.0% | | | | 30.0% | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 975,000 | 950,000 | 925,000 | 900,000 | 875,000 | 850,000 | 825,000 | 800,000 | 775,000 | 750,000 | 725,000 | 700,000 | 675,000 | 650,000 | 625,000 | 600,000 |
| Price/Share | 20.00 | 19.00 | 18.00 | 17.00 | 16.00 | 15.00 | 14.00 | 13.00 | 12.00 | 11.00 | 10.00 | 9.00 | 8.00 | 7.00 | 6.00 | 5.00 | 4.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 6.00 | 5.70 | 5.40 | 5.10 | 4.80 | 4.50 | 4.20 | 3.90 | 3.60 | 3.30 | 3.00 | 2.70 | 2.40 | 2.10 | 1.80 | 1.50 |
| R-Penalty Pool | 0 | 600000 | 570000 | 540000 | 510000 | 480000 | 450000 | 420000 | 390000 | 360000 | 330000 | 300000 | 270000 | 240000 | 210000 | 180000 | 150000 |
| R-Penalty/Holder of Record | 0.000 | 0.684 | 0.667 | 0.649 | 0.630 | 0.610 | 0.588 | 0.566 | 0.542 | 0.516 | 0.489 | 0.460 | 0.429 | 0.395 | 0.359 | 0.320 | 0.278 |
| | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 190.00 | 180.00 | 170.00 | 160.00 | 150.00 | 140.00 | 130.00 | 120.00 | 110.00 | 100.00 | 90.00 | 80.00 | 70.00 | 60.00 | 50.00 | 40.00 |
| R-Penalty Dividend Received | 0.00 | 6.84 | 6.67 | 6.49 | 6.30 | 6.10 | 5.88 | 5.66 | 5.42 | 5.16 | 4.89 | 4.60 | 4.29 | 3.95 | 3.59 | 3.20 | 2.78 |
| Value at end of Period | 200.00 | 196.84 | 186.67 | 176.49 | 166.30 | 156.10 | 145.88 | 135.66 | 125.42 | 115.16 | 104.89 | 94.60 | 84.29 | 73.95 | 63.59 | 53.20 | 42.78 |
| Cumulative R-Dividend | 0.00 | 6.84 | 13.50 | 19.99 | 26.29 | 32.38 | 38.26 | 43.92 | 49.34 | 54.50 | 59.39 | 63.99 | 68.27 | 72.22 | 75.81 | 79.01 | 81.79 |
| Taxes on R-Dividends @5% | 0.00 | -0.34 | -0.68 | -1.00 | -1.31 | -1.62 | -1.91 | -2.20 | -2.47 | -2.72 | -2.97 | -3.20 | -3.41 | -3.61 | -3.79 | -3.95 | -4.09 |
| Gain (Loss) To Date | - | (10.00) | (20.00) | (30.00) | (40.00) | (50.00) | (60.00) | (70.00) | (80.00) | (90.00) | (100.00) | (110.00) | (120.00) | (130.00) | (140.00) | (150.00) | (160.00) |
| Loss Tax Credit @ 28% | - | 2.80 | 5.60 | 8.40 | 11.20 | 14.00 | 16.80 | 19.60 | 22.40 | 25.20 | 28.00 | 30.80 | 33.60 | 36.40 | 39.20 | 42.00 | 44.80 |
| R-Penalty at sale | (60.00) | (57.00) | (54.00) | (51.00) | (48.00) | (45.00) | (42.00) | (39.00) | (36.00) | (33.00) | (30.00) | (27.00) | (24.00) | (21.00) | (18.00) | (15.00) | (12.00) |
| Cumulative Value | 140.00 | 142.30 | 144.43 | 146.39 | 148.17 | 149.76 | 151.15 | 152.33 | 153.27 | 153.97 | 154.42 | 154.59 | 154.46 | 154.01 | 153.22 | 152.06 | 150.50 |

*FIG. 6D*

Financial Simulation with Increasing Share Values: R-Penalty = 0%

CONVENTIONAL STOCK AND INCREASING SHARE PRICE

| R-PENALTY % | 0.0% | | | | 0.0% | | | | 0.0% | | | | 0.0% | | | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,025,000 | 1,050,000 | 1,075,000 | 1,100,000 | 1,125,000 | 1,150,000 | 1,175,000 | 1,200,000 | 1,225,000 | 1,250,000 | 1,275,000 | 1,300,000 | 1,325,000 | 1,350,000 | 1,375,000 | 1,400,000 |
| Price/Share | 20.00 | 21.00 | 22.00 | 23.00 | 24.00 | 25.00 | 26.00 | 27.00 | 28.00 | 29.00 | 30.00 | 31.00 | 32.00 | 33.00 | 34.00 | 35.00 | 36.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| R-Penalty Pool | 0 | 0 | 0 | 0 | 0 | 0 | 0 | 0 | 0 | 0 | 0 | 0 | 0 | 0 | 0 | 0 | 0 |
| R-Penalty/Holder of Record | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 210.00 | 220.00 | 230.00 | 240.00 | 250.00 | 260.00 | 270.00 | 280.00 | 290.00 | 300.00 | 310.00 | 320.00 | 330.00 | 340.00 | 350.00 | 360.00 |
| R-Penalty Dividend Received | N/A | N/A | N/A | N/A | N/A | N/A | N/A | N/A | N/A | N/A | N/A | N/A | N/A | N/A | N/A | N/A | N/A |
| Value at end of Period | 200.00 | 210.00 | 220.00 | 230.00 | 240.00 | 250.00 | 260.00 | 270.00 | 280.00 | 290.00 | 300.00 | 310.00 | 320.00 | 330.00 | 340.00 | 350.00 | 360.00 |
| Cumulative R-Dividend | N/A | N/A | N/A | N/A | N/A | N/A | N/A | N/A | N/A | N/A | N/A | N/A | N/A | N/A | N/A | N/A | N/A |
| Taxes on R-Dividends @5% | N/A | N/A | N/A | N/A | N/A | N/A | N/A | N/A | N/A | N/A | N/A | N/A | N/A | N/A | N/A | N/A | N/A |
| Gain (Loss) To Date | - | 10.00 | 20.00 | 30.00 | 40.00 | 50.00 | 60.00 | 70.00 | 80.00 | 90.00 | 100.00 | 110.00 | 120.00 | 130.00 | 140.00 | 150.00 | 160.00 |
| Cap Gains @ 20% | - | (2.00) | (4.00) | (6.00) | (8.00) | (10.00) | (12.00) | (14.00) | (16.00) | (18.00) | (20.00) | (22.00) | (24.00) | (26.00) | (28.00) | (30.00) | (32.00) |
| R-Penalty at sale | N/A | N/A | N/A | N/A | N/A | N/A | N/A | N/A | N/A | N/A | N/A | N/A | N/A | N/A | N/A | N/A | N/A |
| Cumulative Value | 200.00 | 208.00 | 216.00 | 224.00 | 232.00 | 240.00 | 248.00 | 256.00 | 264.00 | 272.00 | 280.00 | 288.00 | 296.00 | 304.00 | 312.00 | 320.00 | 328.00 |

*FIG. 7A*

Financial Simulation with Increasing Share Values: R-Penalty = 10%

FLAT R-PENALTY RATE AND INCREASING R-SHARE PRICE

| R-PENALTY % | | 10.0% | | | | | 10.0% | | | | | 10.0% | | | | | 10.0% | |
|---|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,025,000 | 1,050,000 | 1,075,000 | 1,100,000 | 1,125,000 | 1,150,000 | 1,175,000 | 1,200,000 | 1,225,000 | 1,250,000 | 1,275,000 | 1,300,000 | 1,325,000 | 1,350,000 | 1,375,000 | 1,400,000 |
| Price/Share | 20.00 | 21.00 | 22.00 | 23.00 | 24.00 | 25.00 | 26.00 | 27.00 | 28.00 | 29.00 | 30.00 | 31.00 | 32.00 | 33.00 | 34.00 | 35.00 | 36.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 2.00 | 2.10 | 2.20 | 2.30 | 2.40 | 2.50 | 2.60 | 2.70 | 2.80 | 2.90 | 3.00 | 3.10 | 3.20 | 3.30 | 3.40 | 3.50 |
| R-Penalty Pool | 0 | 200000 | 210000 | 220000 | 230000 | 240000 | 250000 | 260000 | 270000 | 280000 | 290000 | 300000 | 310000 | 320000 | 330000 | 340000 | 350000 |
| R-Penalty/Holder of Record | 0.000 | 0.217 | 0.222 | 0.227 | 0.232 | 0.237 | 0.242 | 0.246 | 0.250 | 0.254 | 0.258 | 0.261 | 0.265 | 0.268 | 0.272 | 0.275 | 0.278 |
| | 0 | 0 | 0 | 0 | 0 | 0 | 0 | 0 | 0 | 0 | 0 | 0 | 0 | 0 | 0 | 0 | 0 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 210.00 | 220.00 | 230.00 | 240.00 | 250.00 | 260.00 | 270.00 | 280.00 | 290.00 | 300.00 | 310.00 | 320.00 | 330.00 | 340.00 | 350.00 | 360.00 |
| R-Penalty Dividend Received | 0.00 | 2.17 | 2.22 | 2.27 | 2.32 | 2.37 | 2.42 | 2.46 | 2.50 | 2.54 | 2.58 | 2.61 | 2.65 | 2.68 | 2.72 | 2.75 | 2.78 |
| Value at end of Period | 200.00 | 212.17 | 222.22 | 232.27 | 242.32 | 252.37 | 262.42 | 272.46 | 282.50 | 292.54 | 302.58 | 312.61 | 322.65 | 332.68 | 342.72 | 352.75 | 362.78 |
| Cumulative R-Dividend | 0.00 | 2.17 | 4.39 | 6.66 | 8.99 | 11.36 | 13.77 | 16.23 | 18.73 | 21.27 | 23.85 | 26.46 | 29.11 | 31.80 | 34.51 | 37.26 | 40.04 |
| Taxes on R-Dividends @5% | 0.00 | -0.11 | -0.22 | -0.33 | -0.45 | -0.57 | -0.69 | -0.81 | -0.94 | -1.06 | -1.19 | -1.32 | -1.46 | -1.59 | -1.73 | -1.86 | -2.00 |
| Gain (Loss) To Date | - | 10.00 | 20.00 | 30.00 | 40.00 | 50.00 | 60.00 | 70.00 | 80.00 | 90.00 | 100.00 | 110.00 | 120.00 | 130.00 | 140.00 | 150.00 | 160.00 |
| Cap Gains @ 10% | - | (1.00) | (2.00) | (3.00) | (4.00) | (5.00) | (6.00) | (7.00) | (8.00) | (9.00) | (10.00) | (11.00) | (12.00) | (13.00) | (14.00) | (15.00) | (16.00) |
| R-Penalty at sale | (20.00) | (21.00) | (22.00) | (23.00) | (24.00) | (25.00) | (26.00) | (27.00) | (28.00) | (29.00) | (30.00) | (31.00) | (32.00) | (33.00) | (34.00) | (35.00) | (36.00) |
| Cumulative Value | 180.00 | 190.06 | 200.17 | 210.33 | 220.54 | 230.79 | 241.08 | 251.42 | 261.80 | 272.21 | 282.66 | 293.14 | 303.66 | 314.21 | 324.79 | 335.40 | 346.04 |

*FIG. 7B*

Financial Simulation with Increasing Share Values: R-Penalty = 20%

FLAT R-PENALTY RATE AND INCREASING R-SHARE PRICE

| R-PENALTY % | | 20.0% | | | | | 20.0% | | | | | 20.0% | | | | | 20.0% | |
|---|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,025,000 | 1,050,000 | 1,075,000 | 1,100,000 | 1,125,000 | 1,150,000 | 1,175,000 | 1,200,000 | 1,225,000 | 1,250,000 | 1,275,000 | 1,300,000 | 1,325,000 | 1,350,000 | 1,375,000 | 1,400,000 |
| Price/Share | 20.00 | 21.00 | 22.00 | 23.00 | 24.00 | 25.00 | 26.00 | 27.00 | 28.00 | 29.00 | 30.00 | 31.00 | 32.00 | 33.00 | 34.00 | 35.00 | 36.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 4.00 | 4.20 | 4.40 | 4.60 | 4.80 | 5.00 | 5.20 | 5.40 | 5.60 | 5.80 | 6.00 | 6.20 | 6.40 | 6.60 | 6.80 | 7.00 |
| R-Penalty Pool | 0 | 400000 | 420000 | 440000 | 460000 | 480000 | 500000 | 520000 | 540000 | 560000 | 580000 | 600000 | 620000 | 640000 | 660000 | 680000 | 700000 |
| R-Penalty/Holder of Record | 0.000 | 0.434 | 0.444 | 0.455 | 0.465 | 0.474 | 0.483 | 0.492 | 0.500 | 0.508 | 0.516 | 0.523 | 0.530 | 0.537 | 0.543 | 0.549 | 0.556 |
| | 0 | 0 | 0 | 0 | 0 | 0 | 0 | 0 | 0 | 0 | 0 | 0 | 0 | 0 | 0 | 0 | 0 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 210.00 | 220.00 | 230.00 | 240.00 | 250.00 | 260.00 | 270.00 | 280.00 | 290.00 | 300.00 | 310.00 | 320.00 | 330.00 | 340.00 | 350.00 | 360.00 |
| R-Penalty Dividend Received | 0.00 | 4.34 | 4.44 | 4.55 | 4.65 | 4.74 | 4.83 | 4.92 | 5.00 | 5.08 | 5.16 | 5.23 | 5.30 | 5.37 | 5.43 | 5.49 | 5.56 |
| Value at end of Period | 200.00 | 214.34 | 224.44 | 234.55 | 244.65 | 254.74 | 264.83 | 274.92 | 285.00 | 295.08 | 305.16 | 315.23 | 325.30 | 335.37 | 345.43 | 355.49 | 365.56 |
| Cumulative R-Dividend | 0.00 | 4.34 | 8.78 | 13.33 | 17.97 | 22.72 | 27.55 | 32.46 | 37.46 | 42.54 | 47.70 | 52.93 | 58.23 | 63.59 | 69.03 | 74.52 | 80.08 |
| Taxes on R-Dividends @5% | 0.00 | -0.22 | -0.44 | -0.67 | -0.90 | -1.14 | -1.38 | -1.62 | -1.87 | -2.13 | -2.38 | -2.65 | -2.91 | -3.18 | -3.45 | -3.73 | -4.00 |
| Gain (Loss) To Date | - | 10.00 | 20.00 | 30.00 | 40.00 | 50.00 | 60.00 | 70.00 | 80.00 | 90.00 | 100.00 | 110.00 | 120.00 | 130.00 | 140.00 | 150.00 | 160.00 |
| Cap Gains @ 10% | - | (1.00) | (2.00) | (3.00) | (4.00) | (5.00) | (6.00) | (7.00) | (8.00) | (9.00) | (10.00) | (11.00) | (12.00) | (13.00) | (14.00) | (15.00) | (16.00) |
| R-Penalty at sale | (40.00) | (42.00) | (44.00) | (46.00) | (48.00) | (50.00) | (52.00) | (54.00) | (56.00) | (58.00) | (60.00) | (62.00) | (64.00) | (66.00) | (68.00) | (70.00) | (72.00) |
| Cumulative Value | 160.00 | 171.12 | 182.34 | 193.66 | 205.08 | 216.58 | 228.17 | 239.84 | 251.59 | 263.42 | 275.31 | 287.28 | 299.32 | 311.41 | 323.57 | 335.79 | 348.07 |

FIG. 7C

Financial Simulation with Increasing Share Values: R-Penalty = 30%

FLAT R-PENALTY RATE AND INCREASING R-SHARE PRICE

| R-PENALTY % | | 30.0% | | | | | 30.0% | | | | 30.0% | | | | 30.0% | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,025,000 | 1,050,000 | 1,075,000 | 1,100,000 | 1,125,000 | 1,150,000 | 1,175,000 | 1,200,000 | 1,225,000 | 1,250,000 | 1,275,000 | 1,300,000 | 1,325,000 | 1,350,000 | 1,375,000 | 1,400,000 |
| Price/Share | 20.00 | 21.00 | 22.00 | 23.00 | 24.00 | 25.00 | 26.00 | 27.00 | 28.00 | 29.00 | 30.00 | 31.00 | 32.00 | 33.00 | 34.00 | 35.00 | 36.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 6.00 | 6.30 | 6.60 | 6.90 | 7.20 | 7.50 | 7.80 | 8.10 | 8.40 | 8.70 | 9.00 | 9.30 | 9.60 | 9.90 | 10.20 | 10.50 |
| R-Penalty Pool | 0 | 600000 | 630000 | 660000 | 690000 | 720000 | 750000 | 780000 | 810000 | 840000 | 870000 | 900000 | 930000 | 960000 | 990000 | 1020000 | 1050000 |
| R-Penalty/Holder of Record | 0.000 | 0.650 | 0.667 | 0.682 | 0.697 | 0.711 | 0.725 | 0.738 | 0.750 | 0.762 | 0.773 | 0.784 | 0.795 | 0.805 | 0.815 | 0.824 | 0.833 |
| | 0 | 0 | 0 | 0 | 0 | 0 | 0 | 0 | 0 | 0 | 0 | 0 | 0 | 0 | 0 | 0 | 0 |
| INVESTOR 4 EXAMPLE | 0 | 0 | 0 | 0 | 0 | 0 | 0 | 0 | 0 | 0 | 0 | 0 | 0 | 0 | 0 | 0 | 0 |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 210.00 | 220.00 | 230.00 | 240.00 | 250.00 | 260.00 | 270.00 | 280.00 | 290.00 | 300.00 | 310.00 | 320.00 | 330.00 | 340.00 | 350.00 | 360.00 |
| R-Penalty Dividend Received | 0.00 | 6.50 | 6.67 | 6.82 | 6.97 | 7.11 | 7.25 | 7.38 | 7.50 | 7.62 | 7.73 | 7.84 | 7.95 | 8.05 | 8.15 | 8.24 | 8.33 |
| Value at end of Period | 200.00 | 216.50 | 226.67 | 236.82 | 246.97 | 257.11 | 267.25 | 277.38 | 287.50 | 297.62 | 307.73 | 317.84 | 327.95 | 338.05 | 348.15 | 358.24 | 368.33 |
| Cumulative R-Dividend | 0.00 | 6.50 | 13.17 | 19.99 | 26.96 | 34.07 | 41.32 | 48.70 | 56.20 | 63.81 | 71.55 | 79.39 | 87.34 | 95.39 | 103.54 | 111.78 | 120.11 |
| Taxes on R-Dividends @5% | 0.00 | -0.33 | -0.66 | -1.00 | -1.35 | -1.70 | -2.07 | -2.43 | -2.81 | -3.19 | -3.58 | -3.97 | -4.37 | -4.77 | -5.18 | -5.59 | -6.01 |
| Gain (Loss) To Date | - | 10.00 | 20.00 | 30.00 | 40.00 | 50.00 | 60.00 | 70.00 | 80.00 | 90.00 | 100.00 | 110.00 | 120.00 | 130.00 | 140.00 | 150.00 | 160.00 |
| Cap Gains @ 10% | - | (1.00) | (2.00) | (3.00) | (4.00) | (5.00) | (6.00) | (7.00) | (8.00) | (9.00) | (10.00) | (11.00) | (12.00) | (13.00) | (14.00) | (15.00) | (16.00) |
| R-Penalty at sale | (60.00) | (63.00) | (66.00) | (69.00) | (72.00) | (75.00) | (78.00) | (81.00) | (84.00) | (87.00) | (90.00) | (93.00) | (96.00) | (99.00) | (102.00) | (105.00) | (108.00) |
| Cumulative Value | 140.00 | 152.18 | 164.51 | 176.99 | 189.61 | 202.37 | 215.25 | 228.26 | 241.39 | 254.62 | 267.97 | 281.42 | 294.97 | 308.62 | 322.36 | 336.19 | 350.11 |

*FIG. 7D*

Financial Simulation with Stable Share Values: R-Penalty = 0%

CONVENTIONAL STOCK AND STABLE SHARE PRICE

| R-PENALTY % | | 0.0% | | | | 0.0% | | | | 0.0% | | | | 0.0% | | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 |
| Price/Share | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| R-Penalty Pool | 0 | 0 | 0 | 0 | 0 | 0 | 0 | 0 | 0 | 0 | 0 | 0 | 0 | 0 | 0 | 0 | 0 |
| R-Penalty/Holder of Record | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |
| R-Penalty Dividend Received | N/A | N/A | N/A | N/A | N/A | N/A | N/A | N/A | N/A | N/A | N/A | N/A | N/A | N/A | N/A | N/A | N/A |
| Value at end of Period | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |
| Cumulative R-Dividend | N/A | N/A | N/A | N/A | N/A | N/A | N/A | N/A | N/A | N/A | N/A | N/A | N/A | N/A | N/A | N/A | N/A |
| Taxes on R-Dividends @5% | N/A | N/A | N/A | N/A | N/A | N/A | N/A | N/A | N/A | N/A | N/A | N/A | N/A | N/A | N/A | N/A | N/A |
| Gain (Loss) To Date | . | . | . | . | . | . | . | . | . | . | . | . | . | . | . | . | . |
| Cap Gains @ 20% | N/A | N/A | N/A | N/A | N/A | N/A | N/A | N/A | N/A | N/A | N/A | N/A | N/A | N/A | N/A | N/A | N/A |
| R-Penalty at sale | . | . | . | . | . | . | . | . | . | . | . | . | . | . | . | . | . |
| Cumulative Value | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |

*FIG. 8A*

Financial Simulation with Stable Share Values: R-Penalty = 10%

FLAT R-PENALTY RATE AND STABLE R-SHARE PRICE

| R-PENALTY % | 10.0% | | | | | 10.0% | | | | | 10.0% | | | | | 10.0% | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 |
| Price/Share | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 | 2.00 |
| R-Penalty Pool | 0 | 200000 | 200000 | 200000 | 200000 | 200000 | 200000 | 200000 | 200000 | 200000 | 200000 | 200000 | 200000 | 200000 | 200000 | 200000 | 200000 |
| R-Penalty/Holder of Record | 0.000 | 0.222 | 0.222 | 0.222 | 0.222 | 0.222 | 0.222 | 0.222 | 0.222 | 0.222 | 0.222 | 0.222 | 0.222 | 0.222 | 0.222 | 0.222 | 0.222 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |
| R-Penalty Dividend Received | 0.00 | 2.22 | 2.22 | 2.22 | 2.22 | 2.22 | 2.22 | 2.22 | 2.22 | 2.22 | 2.22 | 2.22 | 2.22 | 2.22 | 2.22 | 2.22 | 2.22 |
| Value at end of Period | 200.00 | 202.22 | 202.22 | 202.22 | 202.22 | 202.22 | 202.22 | 202.22 | 202.22 | 202.22 | 202.22 | 202.22 | 202.22 | 202.22 | 202.22 | 202.22 | 202.22 |
| Cumulative R-Dividend | 0.00 | 2.22 | 4.44 | 6.67 | 8.89 | 11.11 | 13.33 | 15.56 | 17.78 | 20.00 | 22.22 | 24.44 | 26.67 | 28.89 | 31.11 | 33.33 | 35.56 |
| Taxes on R-Dividends @5% | 0.00 | -0.11 | -0.22 | -0.33 | -0.44 | -0.56 | -0.67 | -0.78 | -0.89 | -1.00 | -1.11 | -1.22 | -1.33 | -1.44 | -1.56 | -1.67 | -1.78 |
| Gain (Loss) To Date | . | . | . | . | . | . | . | . | . | . | . | . | . | . | . | . | . |
| Cap Gains @ 10% | . | . | . | . | . | . | . | . | . | . | . | . | . | . | . | . | . |
| R-Penalty at sale | (20.00) | (20.00) | (20.00) | (20.00) | (20.00) | (20.00) | (20.00) | (20.00) | (20.00) | (20.00) | (20.00) | (20.00) | (20.00) | (20.00) | (20.00) | (20.00) | (20.00) |
| Cumulative Value | 180.00 | 182.11 | 184.22 | 186.33 | 188.44 | 190.56 | 192.67 | 194.78 | 196.89 | 199.00 | 201.11 | 203.22 | 205.33 | 207.44 | 209.56 | 211.67 | 213.78 |

*FIG. 8B*

Financial Simulation with Stable Share Values: R-Penalty = 20%

FLAT R-PENALTY RATE AND STABLE R-SHARE PRICE

| R-PENALTY % | | 20.0% | | | | | 20.0% | | | | | 20.0% | | | | | 20.0% | |
|---|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 |
| Price/Share | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 | 4.00 |
| R-Penalty Pool | 0 | 400000 | 400000 | 400000 | 400000 | 400000 | 400000 | 400000 | 400000 | 400000 | 400000 | 400000 | 400000 | 400000 | 400000 | 400000 | 400000 |
| R-Penalty/Holder of Record | 0.000 | 0.444 | 0.444 | 0.444 | 0.444 | 0.444 | 0.444 | 0.444 | 0.444 | 0.444 | 0.444 | 0.444 | 0.444 | 0.444 | 0.444 | 0.444 | 0.444 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |
| R-Penalty Dividend Received | 0.00 | 4.44 | 4.44 | 4.44 | 4.44 | 4.44 | 4.44 | 4.44 | 4.44 | 4.44 | 4.44 | 4.44 | 4.44 | 4.44 | 4.44 | 4.44 | 4.44 |
| Value at end of Period | 200.00 | 204.44 | 204.44 | 204.44 | 204.44 | 204.44 | 204.44 | 204.44 | 204.44 | 204.44 | 204.44 | 204.44 | 204.44 | 204.44 | 204.44 | 204.44 | 204.44 |
| Cumulative R-Dividend | 0.00 | 4.44 | 8.89 | 13.33 | 17.78 | 22.22 | 26.67 | 31.11 | 35.56 | 40.00 | 44.44 | 48.89 | 53.33 | 57.78 | 62.22 | 66.67 | 71.11 |
| Taxes on R-Dividends @5% | 0.00 | -0.22 | -0.44 | -0.67 | -0.89 | -1.11 | -1.33 | -1.56 | -1.78 | -2.00 | -2.22 | -2.44 | -2.67 | -2.89 | -3.11 | -3.33 | -3.56 |
| Gain (Loss) To Date | - | - | - | - | - | - | - | - | - | - | - | - | - | - | - | - | - |
| Cap Gains @ 10% | - | - | - | - | - | - | - | - | - | - | - | - | - | - | - | - | - |
| R-Penalty at sale | (40.00) | (40.00) | (40.00) | (40.00) | (40.00) | (40.00) | (40.00) | (40.00) | (40.00) | (40.00) | (40.00) | (40.00) | (40.00) | (40.00) | (40.00) | (40.00) | (40.00) |
| Cumulative Value | 160.00 | 164.22 | 168.44 | 172.67 | 176.89 | 181.11 | 185.33 | 189.56 | 193.78 | 198.00 | 202.22 | 206.44 | 210.67 | 214.89 | 219.11 | 223.33 | 227.56 |

*FIG. 8C*

Financial Simulation with Stable Share Values: R-Penalty = 30%

FLAT R-PENALTY RATE AND STABLE R-SHARE PRICE

| R-PENALTY % | | 30.0% | | | | 30.0% | | | | 30.0% | | | | 30.0% | | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 |
| Price/Share | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 6.00 | 6.00 | 6.00 | 6.00 | 6.00 | 6.00 | 6.00 | 6.00 | 6.00 | 6.00 | 6.00 | 6.00 | 6.00 | 6.00 | 6.00 | 6.00 |
| R-Penalty Pool | 0 | 600000 | 600000 | 600000 | 600000 | 600000 | 600000 | 600000 | 600000 | 600000 | 600000 | 600000 | 600000 | 600000 | 600000 | 600000 | 600000 |
| R-Penalty/Holder of Record | 0.000 | 0.667 | 0.667 | 0.667 | 0.667 | 0.667 | 0.667 | 0.667 | 0.667 | 0.667 | 0.667 | 0.667 | 0.667 | 0.667 | 0.667 | 0.667 | 0.667 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |
| R-Penalty Dividend Received | 0.00 | 6.67 | 6.67 | 6.67 | 6.67 | 6.67 | 6.67 | 6.67 | 6.67 | 6.67 | 6.67 | 6.67 | 6.67 | 6.67 | 6.67 | 6.67 | 6.67 |
| Value at end of Period | 200.00 | 206.67 | 206.67 | 206.67 | 206.67 | 206.67 | 206.67 | 206.67 | 206.67 | 206.67 | 206.67 | 206.67 | 206.67 | 206.67 | 206.67 | 206.67 | 206.67 |
| Cumulative R-Dividend | 0.00 | 6.67 | 13.33 | 20.00 | 26.67 | 33.33 | 40.00 | 46.67 | 53.33 | 60.00 | 66.67 | 73.33 | 80.00 | 86.67 | 93.33 | 100.00 | 106.67 |
| Taxes on R-Dividends @5% | 0.00 | -0.33 | -0.67 | -1.00 | -1.33 | -1.67 | -2.00 | -2.33 | -2.67 | -3.00 | -3.33 | -3.67 | -4.00 | -4.33 | -4.67 | -5.00 | -5.33 |
| Gain (Loss) To Date | . | . | . | . | . | . | . | . | . | . | . | . | . | . | . | . | . |
| Cap Gains @ 10% | . | . | . | . | . | . | . | . | . | . | . | . | . | . | . | . | . |
| R-Penalty at sale | (60.00) | (60.00) | (60.00) | (60.00) | (60.00) | (60.00) | (60.00) | (60.00) | (60.00) | (60.00) | (60.00) | (60.00) | (60.00) | (60.00) | (60.00) | (60.00) | (60.00) |
| Cumulative Value | 140.00 | 146.33 | 152.67 | 159.00 | 165.33 | 171.67 | 178.00 | 184.33 | 190.67 | 197.00 | 203.33 | 209.67 | 216.00 | 222.33 | 228.67 | 235.00 | 241.33 |

*FIG. 8D*

Financial Simulation with Decreasing Share Values: R-Penalty = 0 – 0%

CONVENTIONAL STOCK AND DECREASING SHARE PRICE

| R-PENALTY % | | 0.0% | | | | 0.0% | | | | 0.0% | | | | 0.0% | | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 975,000 | 950,000 | 925,000 | 900,000 | 875,000 | 850,000 | 825,000 | 800,000 | 775,000 | 750,000 | 725,000 | 700,000 | 675,000 | 650,000 | 625,000 | 600,000 |
| Price/Share | 20.00 | 19.00 | 18.00 | 17.00 | 16.00 | 15.00 | 14.00 | 13.00 | 12.00 | 11.00 | 10.00 | 9.00 | 8.00 | 7.00 | 6.00 | 5.00 | 4.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| R-Penalty Pool | 0 | 0 | 0 | 0 | 0 | 0 | 0 | 0 | 0 | 0 | 0 | 0 | 0 | 0 | 0 | 0 | 0 |
| R-Penalty/Holder of Record | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 190.00 | 180.00 | 170.00 | 160.00 | 150.00 | 140.00 | 130.00 | 120.00 | 110.00 | 100.00 | 90.00 | 80.00 | 70.00 | 60.00 | 50.00 | 40.00 |
| R-Penalty Dividend Received | N/A | N/A | N/A | N/A | N/A | N/A | N/A | N/A | N/A | N/A | N/A | N/A | N/A | N/A | N/A | N/A | N/A |
| Value at end of Period | 200.00 | 190.00 | 180.00 | 170.00 | 160.00 | 150.00 | 140.00 | 130.00 | 120.00 | 110.00 | 100.00 | 90.00 | 80.00 | 70.00 | 60.00 | 50.00 | 40.00 |
| Cumulative R-Dividend | N/A | N/A | N/A | N/A | N/A | N/A | N/A | N/A | N/A | N/A | N/A | N/A | N/A | N/A | N/A | N/A | N/A |
| Taxes on R-Dividends @5% | N/A | N/A | N/A | N/A | N/A | N/A | N/A | N/A | N/A | N/A | N/A | N/A | N/A | N/A | N/A | N/A | N/A |
| Gain (Loss) To Date | - | (10.00) | (20.00) | (30.00) | (40.00) | (50.00) | (60.00) | (70.00) | (80.00) | (90.00) | (100.00) | (110.00) | (120.00) | (130.00) | (140.00) | (150.00) | (160.00) |
| Loss Tax Credit @ 28% | - | 2.80 | 5.60 | 8.40 | 11.20 | 14.00 | 16.80 | 19.60 | 22.40 | 25.20 | 28.00 | 30.80 | 33.60 | 36.40 | 39.20 | 42.00 | 44.80 |
| R-Penalty at sale | N/A | N/A | N/A | N/A | N/A | N/A | N/A | N/A | N/A | N/A | N/A | N/A | N/A | N/A | N/A | N/A | N/A |
| Cumulative Value | 200.00 | 192.80 | 185.60 | 178.40 | 171.20 | 164.00 | 156.80 | 149.60 | 142.40 | 135.20 | 128.00 | 120.80 | 113.60 | 106.40 | 99.20 | 92.00 | 84.80 |

*FIG. 9A*

Financial Simulation with Decreasing Share Values: R-Penalty = 10 → 0%

DECREASING R-PENALTY RATE AND DECREASING R-SHARE PRICE

| R-PENALTY % | | 10.0% | | | | 5.0% | | | | 2.5% | | | | 0.0% | | |
|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 975,000 | 950,000 | 925,000 | 900,000 | 875,000 | 850,000 | 825,000 | 800,000 | 775,000 | 750,000 | 725,000 | 700,000 | 675,000 | 650,000 | 625,000 | 600,000 |
| Price/Share | 20.00 | 19.00 | 18.00 | 17.00 | 16.00 | 15.00 | 14.00 | 13.00 | 12.00 | 11.00 | 10.00 | 9.00 | 8.00 | 7.00 | 6.00 | 5.00 | 4.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 2.00 | 1.90 | 1.80 | 1.70 | 0.80 | 0.75 | 0.70 | 0.65 | 0.30 | 0.28 | 0.25 | 0.23 | 0.00 | 0.00 | 0.00 | 0.00 |
| R-Penalty Pool | 0 | 200000 | 190000 | 180000 | 170000 | 80000 | 75000 | 70000 | 65000 | 30000 | 27500 | 25000 | 22500 | 0 | 0 | 0 | 0 |
| R-Penalty/Holder of Record | 0.000 | 0.228 | 0.222 | 0.216 | 0.210 | 0.102 | 0.098 | 0.094 | 0.090 | 0.043 | 0.041 | 0.038 | 0.036 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 190.00 | 180.00 | 170.00 | 160.00 | 150.00 | 140.00 | 130.00 | 120.00 | 110.00 | 100.00 | 90.00 | 80.00 | 70.00 | 60.00 | 50.00 | 40.00 |
| R-Penalty Dividend Received | 0.00 | 2.28 | 2.22 | 2.16 | 2.10 | 1.02 | 0.98 | 0.94 | 0.90 | 0.43 | 0.41 | 0.38 | 0.36 | 0.00 | 0.00 | 0.00 | 0.00 |
| Value at end of Period | 200.00 | 192.28 | 182.22 | 172.16 | 162.10 | 151.02 | 140.98 | 130.94 | 120.90 | 110.43 | 100.41 | 90.38 | 80.36 | 70.00 | 60.00 | 50.00 | 40.00 |
| Cumulative R-Dividend | 0.00 | 2.28 | 4.50 | 6.66 | 8.76 | 9.78 | 10.76 | 11.70 | 12.60 | 13.03 | 13.44 | 13.82 | 14.18 | 14.18 | 14.18 | 14.18 | 14.18 |
| Taxes on R-Dividends @5% | 0.00 | -0.11 | -0.23 | -0.33 | -0.44 | -0.49 | -0.54 | -0.59 | -0.63 | -0.65 | -0.67 | -0.69 | -0.71 | -0.71 | -0.71 | -0.71 | -0.71 |
| Gain (Loss) To Date | - | (10.00) | (20.00) | (30.00) | (40.00) | (50.00) | (60.00) | (70.00) | (80.00) | (90.00) | (100.00) | (110.00) | (120.00) | (130.00) | (140.00) | (150.00) | (160.00) |
| Loss Tax Credit @ 28% | - | 2.80 | 5.60 | 8.40 | 11.20 | 14.00 | 16.80 | 19.60 | 22.40 | 25.20 | 28.00 | 30.80 | 33.60 | 36.40 | 39.20 | 42.00 | 44.80 |
| R-Penalty at sale | (20.00) | (19.00) | (18.00) | (17.00) | (16.00) | (7.50) | (7.00) | (6.50) | (6.00) | (2.75) | (2.50) | (2.25) | (2.00) | - | - | - | - |
| Cumulative Value | 180.00 | 175.97 | 171.88 | 167.73 | 163.52 | 165.79 | 160.02 | 154.22 | 148.37 | 144.83 | 138.27 | 131.68 | 125.07 | 119.87 | 112.67 | 105.47 | 98.27 |

*FIG. 9B*

Financial Simulation with Decreasing Share Values: R-Penalty = 20 − 0%

DECREASING R-PENALTY RATE AND DECREASING R-SHARE PRICE

| R-PENALTY % | | 20.0% | | | | 10.0% | | | | 5.0% | | | | 0.0% | | |
|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 975,000 | 950,000 | 925,000 | 900,000 | 875,000 | 850,000 | 825,000 | 800,000 | 775,000 | 750,000 | 725,000 | 700,000 | 675,000 | 650,000 | 625,000 | 600,000 |
| Price/Share | 20.00 | 19.00 | 18.00 | 17.00 | 16.00 | 15.00 | 14.00 | 13.00 | 12.00 | 11.00 | 10.00 | 9.00 | 8.00 | 7.00 | 6.00 | 5.00 | 4.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 4.00 | 3.80 | 3.60 | 3.40 | 1.60 | 1.50 | 1.40 | 1.30 | 0.60 | 0.55 | 0.50 | 0.45 | 0.00 | 0.00 | 0.00 | 0.00 |
| R-Penalty Pool | 0 | 400000 | 380000 | 360000 | 340000 | 160000 | 150000 | 140000 | 130000 | 60000 | 55000 | 50000 | 45000 | 0 | 0 | 0 | 0 |
| R-Penalty/Holder of Record | 0.000 | 0.456 | 0.444 | 0.432 | 0.420 | 0.203 | 0.196 | 0.189 | 0.181 | 0.086 | 0.081 | 0.077 | 0.071 | 0.000 | 0.000 | 0.000 | 0.000 |
| | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 190.00 | 180.00 | 170.00 | 160.00 | 150.00 | 140.00 | 130.00 | 120.00 | 110.00 | 100.00 | 90.00 | 80.00 | 70.00 | 60.00 | 50.00 | 40.00 |
| R-Penalty Dividend Received | 0.00 | 4.56 | 4.44 | 4.32 | 4.20 | 2.03 | 1.96 | 1.89 | 1.81 | 0.86 | 0.81 | 0.77 | 0.71 | 0.00 | 0.00 | 0.00 | 0.00 |
| Value at end of Period | 200.00 | 194.56 | 184.44 | 174.32 | 164.20 | 152.03 | 141.96 | 131.89 | 121.81 | 110.86 | 100.81 | 90.77 | 80.71 | 70.00 | 60.00 | 50.00 | 40.00 |
| Cumulative R-Dividend | 0.00 | 4.56 | 9.00 | 13.33 | 17.52 | 19.56 | 21.52 | 23.40 | 25.21 | 26.07 | 26.88 | 27.65 | 28.36 | 28.36 | 28.36 | 28.36 | 28.36 |
| Taxes on R-Dividends @5% | 0.00 | -0.23 | -0.45 | -0.67 | -0.88 | -0.98 | -1.08 | -1.17 | -1.26 | -1.30 | -1.34 | -1.38 | -1.42 | -1.42 | -1.42 | -1.42 | -1.42 |
| Gain (Loss) To Date | - | (10.00) | (20.00) | (30.00) | (40.00) | (50.00) | (60.00) | (70.00) | (80.00) | (90.00) | (100.00) | (110.00) | (120.00) | (130.00) | (140.00) | (150.00) | (160.00) |
| Loss Tax Credit @ 28% | - | 2.80 | 5.60 | 8.40 | 11.20 | 14.00 | 16.80 | 19.60 | 22.40 | 25.20 | 28.00 | 30.80 | 33.60 | 36.40 | 39.20 | 42.00 | 44.80 |
| R-Penalty at sale | (40.00) | (38.00) | (36.00) | (34.00) | (32.00) | (15.00) | (14.00) | (13.00) | (12.00) | (5.50) | (5.00) | (4.50) | (4.00) | - | - | - | - |
| Cumulative Value | 160.00 | 159.13 | 158.15 | 157.06 | 155.85 | 167.58 | 163.24 | 158.83 | 154.35 | 154.47 | 148.54 | 142.57 | 136.55 | 133.35 | 126.15 | 118.95 | 111.75 |

*FIG. 9C*

Financial Simulation with Decreasing Share Values: R-Penalty = 30 – 0%

DECREASING R-PENALTY RATE AND DECREASING R-SHARE PRICE

| R-PENALTY % | | 30.0% | | | | 15.0% | | | | 7.5% | | | | 0.0% | | |
|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 975,000 | 950,000 | 925,000 | 900,000 | 875,000 | 850,000 | 825,000 | 800,000 | 775,000 | 750,000 | 725,000 | 700,000 | 675,000 | 650,000 | 625,000 | 600,000 |
| Price/Share | 20.00 | 19.00 | 18.00 | 17.00 | 16.00 | 15.00 | 14.00 | 13.00 | 12.00 | 11.00 | 10.00 | 9.00 | 8.00 | 7.00 | 6.00 | 5.00 | 4.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 6.00 | 5.70 | 5.40 | 5.10 | 2.40 | 2.25 | 2.10 | 1.95 | 0.90 | 0.83 | 0.75 | 0.68 | 0.00 | 0.00 | 0.00 | 0.00 |
| R-Penalty Pool | 0 | 600000 | 570000 | 540000 | 510000 | 240000 | 225000 | 210000 | 195000 | 90000 | 82500 | 75000 | 67500 | 0 | 0 | 0 | 0 |
| R-Penalty/Holder of Record | 0.000 | 0.684 | 0.667 | 0.649 | 0.630 | 0.305 | 0.294 | 0.283 | 0.271 | 0.129 | 0.122 | 0.115 | 0.107 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 190.00 | 180.00 | 170.00 | 160.00 | 150.00 | 140.00 | 130.00 | 120.00 | 110.00 | 100.00 | 90.00 | 80.00 | 70.00 | 60.00 | 50.00 | 40.00 |
| R-Penalty Dividend Received | 0.00 | 6.84 | 6.67 | 6.49 | 6.30 | 3.05 | 2.94 | 2.83 | 2.71 | 1.29 | 1.22 | 1.15 | 1.07 | 0.00 | 0.00 | 0.00 | 0.00 |
| Value at end of Period | 200.00 | 196.84 | 186.67 | 176.49 | 166.30 | 153.05 | 142.94 | 132.83 | 122.71 | 111.29 | 101.22 | 91.15 | 81.07 | 70.00 | 60.00 | 50.00 | 40.00 |
| Cumulative R-Dividend | 0.00 | 6.84 | 13.50 | 19.99 | 26.29 | 29.33 | 32.28 | 35.10 | 37.81 | 39.10 | 40.33 | 41.47 | 42.55 | 42.55 | 42.55 | 42.55 | 42.55 |
| Taxes on R-Dividends @5% | 0.00 | -0.34 | -0.68 | -1.00 | -1.31 | -1.47 | -1.61 | -1.76 | -1.89 | -1.96 | -2.02 | -2.07 | -2.13 | -2.13 | -2.13 | -2.13 | -2.13 |
| Gain (Loss) To Date | - | (10.00) | (20.00) | (30.00) | (40.00) | (50.00) | (60.00) | (70.00) | (80.00) | (90.00) | (100.00) | (110.00) | (120.00) | (130.00) | (140.00) | (150.00) | (160.00) |
| Loss Tax Credit @ 28% | - | 2.80 | 5.60 | 8.40 | 11.20 | 14.00 | 16.80 | 19.60 | 22.40 | 25.20 | 28.00 | 30.80 | 33.60 | 36.40 | 39.20 | 42.00 | 44.80 |
| R-Penalty at sale | (60.00) | (57.00) | (54.00) | (51.00) | (48.00) | (22.50) | (21.00) | (19.50) | (18.00) | (8.25) | (7.50) | (6.75) | (6.00) | - | - | - | - |
| Cumulative Value | 140.00 | 142.30 | 144.43 | 146.39 | 148.17 | 169.37 | 166.46 | 163.45 | 160.32 | 164.10 | 158.81 | 153.45 | 148.02 | 146.82 | 139.62 | 132.42 | 125.22 |

FIG. 9D

Financial Simulation with Increasing Share Values: R-Penalty = 0 – 0%

CONVENTIONAL STOCK AND INCREASING SHARE PRICE

| R-PENALTY % | | 0.0% | | | | | 0.0% | | | | | 0.0% | | | | | 0.0% | |
|---|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,025,000 | 1,050,000 | 1,075,000 | 1,100,000 | 1,125,000 | 1,150,000 | 1,175,000 | 1,200,000 | 1,225,000 | 1,250,000 | 1,275,000 | 1,300,000 | 1,325,000 | 1,350,000 | 1,375,000 | 1,400,000 |
| Price/Share | 20.00 | 21.00 | 22.00 | 23.00 | 24.00 | 25.00 | 26.00 | 27.00 | 28.00 | 29.00 | 30.00 | 31.00 | 32.00 | 33.00 | 34.00 | 35.00 | 36.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| R-Penalty Pool | 0 | 0 | 0 | 0 | 0 | 0 | 0 | 0 | 0 | 0 | 0 | 0 | 0 | 0 | 0 | 0 | 0 |
| R-Penalty/Holder of Record | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| | | | | | | | | | | | | | | | | | |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 210.00 | 220.00 | 230.00 | 240.00 | 250.00 | 260.00 | 270.00 | 280.00 | 290.00 | 300.00 | 310.00 | 320.00 | 330.00 | 340.00 | 350.00 | 360.00 |
| R-Penalty Dividend Received | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Value at end of Period | 200.00 | 210.00 | 220.00 | 230.00 | 240.00 | 250.00 | 260.00 | 270.00 | 280.00 | 290.00 | 300.00 | 310.00 | 320.00 | 330.00 | 340.00 | 350.00 | 360.00 |
| Cumulative R-Dividend | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Taxes on R-Dividends @5% | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Gain (Loss) To Date | - | 10.00 | 20.00 | 30.00 | 40.00 | 50.00 | 60.00 | 70.00 | 80.00 | 90.00 | 100.00 | 110.00 | 120.00 | 130.00 | 140.00 | 150.00 | 160.00 |
| Cap Gains @ 20% | - | 1.00 | 2.00 | 3.00 | 4.00 | 5.00 | 6.00 | 7.00 | 8.00 | 9.00 | 10.00 | 11.00 | 12.00 | 13.00 | 14.00 | 15.00 | 16.00 |
| R-Penalty at sale | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Cumulative Value | 200.00 | 211.00 | 222.00 | 233.00 | 244.00 | 255.00 | 266.00 | 277.00 | 288.00 | 299.00 | 310.00 | 321.00 | 332.00 | 343.00 | 354.00 | 365.00 | 376.00 |

*FIG. 10A*

Financial Simulation with Increasing Share Values: R-Penalty = 10 – 0%

DECREASING R-PENALTY RATE AND INCREASING R-SHARE PRICE

| R-PENALTY % | 10.0% | | | | 5.0% | | | | 2.5% | | | | 0.0% | | | |
|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,025,000 | 1,050,000 | 1,075,000 | 1,100,000 | 1,125,000 | 1,150,000 | 1,175,000 | 1,200,000 | 1,225,000 | 1,250,000 | 1,275,000 | 1,300,000 | 1,325,000 | 1,350,000 | 1,375,000 | 1,400,000 |
| Price/Share | 20.00 | 21.00 | 22.00 | 23.00 | 24.00 | 25.00 | 26.00 | 27.00 | 28.00 | 29.00 | 30.00 | 31.00 | 32.00 | 33.00 | 34.00 | 35.00 | 36.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 2.00 | 2.10 | 2.20 | 2.30 | 1.20 | 1.25 | 1.30 | 1.35 | 0.70 | 0.73 | 0.75 | 0.78 | 0.00 | 0.00 | 0.00 | 0.00 |
| R-Penalty Pool | 0 | 200000 | 210000 | 220000 | 230000 | 120000 | 125000 | 130000 | 135000 | 70000 | 72500 | 75000 | 77500 | 0 | 0 | 0 | 0 |
| R-Penalty/Holder of Record | 0.000 | 0.217 | 0.222 | 0.227 | 0.232 | 0.119 | 0.121 | 0.123 | 0.125 | 0.063 | 0.064 | 0.065 | 0.066 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 210.00 | 220.00 | 230.00 | 240.00 | 250.00 | 260.00 | 270.00 | 280.00 | 290.00 | 300.00 | 310.00 | 320.00 | 330.00 | 340.00 | 350.00 | 360.00 |
| R-Penalty Dividend Received | 0.00 | 2.17 | 2.22 | 2.27 | 2.32 | 1.19 | 1.21 | 1.23 | 1.25 | 0.63 | 0.64 | 0.65 | 0.66 | 0.00 | 0.00 | 0.00 | 0.00 |
| Value at end of Period | 200.00 | 212.17 | 222.22 | 232.27 | 242.32 | 251.19 | 261.21 | 271.23 | 281.25 | 290.63 | 300.64 | 310.65 | 320.66 | 330.00 | 340.00 | 350.00 | 360.00 |
| Cumulative R-Dividend | 0.00 | 2.17 | 4.39 | 6.66 | 8.99 | 10.17 | 11.38 | 12.61 | 13.86 | 14.49 | 15.14 | 15.79 | 16.45 | 16.45 | 16.45 | 16.45 | 16.45 |
| Taxes on R-Dividends @5% | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Gain (Loss) To Date | - | 10.00 | 20.00 | 30.00 | 40.00 | 50.00 | 60.00 | 70.00 | 80.00 | 90.00 | 100.00 | 110.00 | 120.00 | 130.00 | 140.00 | 150.00 | 160.00 |
| Cap Gains @ 10% | - | 1.00 | 2.00 | 3.00 | 4.00 | 5.00 | 6.00 | 7.00 | 8.00 | 9.00 | 10.00 | 11.00 | 12.00 | 13.00 | 14.00 | 15.00 | 16.00 |
| R-Penalty at sale | (20.00) | (21.00) | (22.00) | (23.00) | (24.00) | (12.50) | (13.00) | (13.50) | (14.00) | (7.25) | (7.50) | (7.75) | (8.00) | - | - | - | - |
| Cumulative Value | 180.00 | 192.17 | 204.39 | 216.66 | 228.99 | 252.67 | 264.38 | 276.11 | 287.86 | 306.24 | 317.64 | 329.04 | 340.45 | 359.45 | 370.45 | 381.45 | 392.45 |

*FIG. 10B*

Financial Simulation with Increasing Share Values: R-Penalty = 20 – 0%

DECREASING R-PENALTY RATE AND INCREASING R-SHARE PRICE

| R-PENALTY % | 20.0% | | | | | 10.0% | | | | | 5.0% | | | 0.0% | | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,025,000 | 1,050,000 | 1,075,000 | 1,100,000 | 1,125,000 | 1,150,000 | 1,175,000 | 1,200,000 | 1,225,000 | 1,250,000 | 1,275,000 | 1,300,000 | 1,325,000 | 1,350,000 | 1,375,000 | 1,400,000 |
| Price/Share | 20.00 | 21.00 | 22.00 | 23.00 | 24.00 | 25.00 | 26.00 | 27.00 | 28.00 | 29.00 | 30.00 | 31.00 | 32.00 | 33.00 | 34.00 | 35.00 | 36.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 4.00 | 4.20 | 4.40 | 4.60 | 2.40 | 2.50 | 2.60 | 2.70 | 1.40 | 1.45 | 1.50 | 1.55 | 0.00 | 0.00 | 0.00 | 0.00 |
| R-Penalty Pool | 0 | 400000 | 420000 | 440000 | 460000 | 240000 | 250000 | 260000 | 270000 | 140000 | 145000 | 150000 | 155000 | 0 | 0 | 0 | 0 |
| R-Penalty/Holder of Record | 0.000 | 0.434 | 0.444 | 0.455 | 0.465 | 0.237 | 0.242 | 0.246 | 0.250 | 0.127 | 0.129 | 0.131 | 0.132 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 210.00 | 220.00 | 230.00 | 240.00 | 250.00 | 260.00 | 270.00 | 280.00 | 290.00 | 300.00 | 310.00 | 320.00 | 330.00 | 340.00 | 350.00 | 360.00 |
| R-Penalty Dividend Received | 0.00 | 4.34 | 4.44 | 4.55 | 4.65 | 2.37 | 2.42 | 2.46 | 2.50 | 1.27 | 1.29 | 1.31 | 1.32 | 0.00 | 0.00 | 0.00 | 0.00 |
| Value at end of Period | 200.00 | 214.34 | 224.44 | 234.55 | 244.65 | 252.37 | 262.42 | 272.46 | 282.50 | 291.27 | 301.29 | 311.31 | 321.32 | 330.00 | 340.00 | 350.00 | 360.00 |
| Cumulative R-Dividend | 0.00 | 4.34 | 8.78 | 13.33 | 17.97 | 20.35 | 22.76 | 25.22 | 27.72 | 28.99 | 30.28 | 31.59 | 32.91 | 32.91 | 32.91 | 32.91 | 32.91 |
| Taxes on R-Dividends @5% | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Gain (Loss) To Date | - | 10.00 | 20.00 | 30.00 | 40.00 | 50.00 | 60.00 | 70.00 | 80.00 | 90.00 | 100.00 | 110.00 | 120.00 | 130.00 | 140.00 | 150.00 | 160.00 |
| Cap Gains @ 10% | - | 1.00 | 2.00 | 3.00 | 4.00 | 5.00 | 6.00 | 7.00 | 8.00 | 9.00 | 10.00 | 11.00 | 12.00 | 13.00 | 14.00 | 15.00 | 16.00 |
| R-Penalty at sale | (40.00) | (42.00) | (44.00) | (46.00) | (48.00) | (25.00) | (26.00) | (27.00) | (28.00) | (14.50) | (15.00) | (15.50) | (16.00) | - | - | - | - |
| Cumulative Value | 160.00 | 173.34 | 186.78 | 200.33 | 213.97 | 250.35 | 262.76 | 275.22 | 287.72 | 313.49 | 325.28 | 337.09 | 348.91 | 375.91 | 386.91 | 397.91 | 408.91 |

*FIG. 10C*

Financial Simulation with Increasing Share Values: R-Penalty = 30 – 0%

DECREASING R-PENALTY RATE AND INCREASING R-SHARE PRICE

| R-PENALTY % | 30.0% | | | | | 15.0% | | | | 7.5% | | | | 0.0% | | |
|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,025,000 | 1,050,000 | 1,075,000 | 1,100,000 | 1,125,000 | 1,150,000 | 1,175,000 | 1,200,000 | 1,225,000 | 1,250,000 | 1,275,000 | 1,300,000 | 1,325,000 | 1,350,000 | 1,375,000 | 1,400,000 |
| Price/Share | 20.00 | 21.00 | 22.00 | 23.00 | 24.00 | 25.00 | 26.00 | 27.00 | 28.00 | 29.00 | 30.00 | 31.00 | 32.00 | 33.00 | 34.00 | 35.00 | 36.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 6.00 | 6.30 | 6.60 | 6.90 | 3.60 | 3.75 | 3.90 | 4.05 | 2.10 | 2.18 | 2.25 | 2.33 | 0.00 | 0.00 | 0.00 | 0.00 |
| R-Penalty Pool | 0 | 600000 | 630000 | 660000 | 690000 | 360000 | 375000 | 390000 | 405000 | 210000 | 217500 | 225000 | 232500 | 0 | 0 | 0 | 0 |
| R-Penalty/Holder of Record | 0.000 | 0.650 | 0.667 | 0.682 | 0.697 | 0.356 | 0.362 | 0.369 | 0.375 | 0.190 | 0.193 | 0.196 | 0.199 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 210.00 | 220.00 | 230.00 | 240.00 | 250.00 | 260.00 | 270.00 | 280.00 | 290.00 | 300.00 | 310.00 | 320.00 | 330.00 | 340.00 | 350.00 | 360.00 |
| R-Penalty Dividend Received | 0.00 | 6.50 | 6.67 | 6.82 | 6.97 | 3.56 | 3.62 | 3.69 | 3.75 | 1.90 | 1.93 | 1.96 | 1.99 | 0.00 | 0.00 | 0.00 | 0.00 |
| Value at end of Period | 200.00 | 216.50 | 226.67 | 236.82 | 246.97 | 253.56 | 263.62 | 273.69 | 283.75 | 291.90 | 301.93 | 311.96 | 321.99 | 330.00 | 340.00 | 350.00 | 360.00 |
| Cumulative R-Dividend | 0.00 | 6.50 | 13.17 | 19.99 | 26.96 | 30.52 | 34.14 | 37.83 | 41.58 | 43.48 | 45.42 | 47.38 | 49.36 | 49.36 | 49.36 | 49.36 | 49.36 |
| Taxes on R-Dividends @5% | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Gain (Loss) To Date | - | 10.00 | 20.00 | 30.00 | 40.00 | 50.00 | 60.00 | 70.00 | 80.00 | 90.00 | 100.00 | 110.00 | 120.00 | 130.00 | 140.00 | 150.00 | 160.00 |
| Cap Gains @ 10% | - | 1.00 | 2.00 | 3.00 | 4.00 | 5.00 | 6.00 | 7.00 | 8.00 | 9.00 | 10.00 | 11.00 | 12.00 | 13.00 | 14.00 | 15.00 | 16.00 |
| R-Penalty at sale | (60.00) | (63.00) | (66.00) | (69.00) | (72.00) | (37.50) | (39.00) | (40.50) | (42.00) | (21.75) | (22.50) | (23.25) | (24.00) | - | - | - | - |
| Cumulative Value | 140.00 | 154.50 | 169.17 | 183.99 | 198.96 | 248.02 | 261.14 | 274.33 | 287.58 | 320.73 | 332.92 | 345.13 | 357.36 | 392.36 | 403.36 | 414.36 | 425.36 |

*FIG. 10D*

Financial Simulation with Stable Share Values: R-Penalty = 0 – 0%

CONVENTIONAL STOCK AND STABLE SHARE PRICE

| R-PENALTY % | 0.0% | | | | 0.0% | | | | 0.0% | | | | 0.0% | | | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 |
| Price/Share | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| R-Penalty Pool | 0 | 0 | 0 | 0 | 0 | 0 | 0 | 0 | 0 | 0 | 0 | 0 | 0 | 0 | 0 | 0 | 0 |
| R-Penalty/Holder of Record | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |
| R-Penalty Dividend Received | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Value at end of Period | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |
| Cumulative R-Dividend | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Taxes on R-Dividends @5% | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Gain (Loss) To Date | . | . | . | . | . | . | . | . | . | . | . | . | . | . | . | . | . |
| Cap Gains @ 20% | . | . | . | . | . | . | . | . | . | . | . | . | . | . | . | . | . |
| R-Penalty at sale | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Cumulative Value | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |

*FIG. 11A*

Financial Simulation with Stable Share Values: R-Penalty = 10 – 0%

DECREASING R-PENALTY RATE AND STABLE R-SHARE PRICE

| R-PENALTY % | 10.0% | | | | 5.0% | | | | 2.5% | | | | 0% | | | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 |
| Price/Share | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 2.00 | 2.00 | 2.00 | 2.00 | 1.00 | 1.00 | 1.00 | 1.00 | 0.50 | 0.50 | 0.50 | 0.50 | 0.00 | 0.00 | 0.00 | 0.00 |
| R-Penalty Pool | 0 | 200000 | 200000 | 200000 | 200000 | 100000 | 100000 | 100000 | 100000 | 50000 | 50000 | 50000 | 50000 | 0 | 0 | 0 | 0 |
| R-Penalty/Holder of Record | 0.000 | 0.222 | 0.222 | 0.222 | 0.222 | 0.111 | 0.111 | 0.111 | 0.111 | 0.056 | 0.056 | 0.056 | 0.056 | 0 | 0 | 0 | 0 |
| | 0 | 0 | 0 | 0 | 0 | 0 | 0 | 0 | 0 | 0 | 0 | 0 | 0 | 0 | 0 | 0 | 0 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |
| R-Penalty Dividend Received | 0.00 | 2.22 | 2.22 | 2.22 | 2.22 | 1.11 | 1.11 | 1.11 | 1.11 | 0.56 | 0.56 | 0.56 | 0.56 | 0.00 | 0.00 | 0.00 | 0.00 |
| Value at end of Period | 200.00 | 202.22 | 202.22 | 202.22 | 202.22 | 201.11 | 201.11 | 201.11 | 201.11 | 200.56 | 200.56 | 200.56 | 200.56 | 200.00 | 200.00 | 200.00 | 200.00 |
| Cumulative R-Dividend | 0.00 | 2.22 | 4.44 | 6.67 | 8.89 | 10.00 | 11.11 | 12.22 | 13.33 | 13.89 | 14.44 | 15.00 | 15.56 | 15.56 | 15.56 | 15.56 | 15.56 |
| Taxes on R-Dividends @5% | 0.00 | -0.11 | -0.22 | -0.33 | -0.44 | -0.50 | -0.56 | -0.61 | -0.67 | -0.69 | -0.72 | -0.75 | -0.78 | -0.78 | -0.78 | -0.78 | -0.78 |
| Gain (Loss) To Date | . | . | . | . | . | . | . | . | . | . | . | . | . | . | . | . | . |
| Cap Gains @ 10% | (20.00) | (20.00) | (20.00) | (20.00) | (20.00) | (10.00) | (10.00) | (10.00) | (10.00) | (5.00) | (5.00) | (5.00) | (5.00) | . | . | . | . |
| R-Penalty at sale | 180.00 | 182.11 | 184.22 | 186.33 | 188.44 | 199.50 | 200.56 | 201.61 | 202.67 | 208.19 | 208.72 | 209.25 | 209.78 | 214.78 | 214.78 | 214.78 | 214.78 |
| Cumulative Value | | | | | | | | | | | | | | | | | |

*FIG. 11B*

Financial Simulation with Stable Share Values: R-Penalty = 20 – 0%

DECREASING R-PENALTY RATE AND STABLE R-SHARE PRICE

| R-PENALTY % | | 20.0% | | | | | 10.0% | | | | 5.0% | | | 0.0% | | | |
|---|---|---|---|---|---|---|---|---|---|---|---|---|---|---|---|---|---|
| TIME | T0 | T1 | T2 | T3 | T4 | T5 | T6 | T7 | T8 | T9 | T10 | T11 | T12 | T13 | T14 | T15 | T16 |
| Shareholders | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 |
| Price/Share | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 0.00 | 4.00 | 4.00 | 4.00 | 4.00 | 2.00 | 2.00 | 2.00 | 2.00 | 1.00 | 1.00 | 1.00 | 1.00 | 0.00 | 0.00 | 0.00 | 0.00 |
| R-Penalty Pool | 0 | 400000 | 400000 | 400000 | 400000 | 200000 | 200000 | 200000 | 200000 | 100000 | 100000 | 100000 | 100000 | 0 | 0 | 0 | 0 |
| R-Penalty/Holder of Record | 0.000 | 0.444 | 0.444 | 0.444 | 0.444 | 0.222 | 0.222 | 0.222 | 0.222 | 0.111 | 0.111 | 0.111 | 0.111 | 0.000 | 0.000 | 0.000 | 0.000 |
| INVESTOR 4 EXAMPLE | | | | | | | | | | | | | | | | | |
| Shares Held | 10 | 10 | 10 | 10 | 10 | 10 | 10 | 10 | 10 | 10 | 10 | 10 | 10 | 10 | 10 | 10 | 10 |
| Holding Value | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |
| R-Penalty Dividend Received | 0.00 | 4.44 | 4.44 | 4.44 | 4.44 | 2.22 | 2.22 | 2.22 | 2.22 | 1.11 | 1.11 | 1.11 | 1.11 | 0.00 | 0.00 | 0.00 | 0.00 |
| Value at end of Period | 200.00 | 204.44 | 204.44 | 204.44 | 204.44 | 202.22 | 202.22 | 202.22 | 202.22 | 201.11 | 201.11 | 201.11 | 201.11 | 200.00 | 200.00 | 200.00 | 200.00 |
| Cumulative R-Dividend | 0.00 | 4.44 | 8.89 | 13.33 | 17.78 | 20.00 | 22.22 | 24.44 | 26.67 | 27.78 | 28.89 | 30.00 | 31.11 | 31.11 | 31.11 | 31.11 | 31.11 |
| Taxes on R-Dividends @5% | 0.00 | -0.22 | -0.44 | -0.67 | -0.89 | -1.00 | -1.11 | -1.22 | -1.33 | -1.39 | -1.44 | -1.50 | -1.56 | -1.56 | -1.56 | -1.56 | -1.56 |
| Gain (Loss) To Date | . | . | . | . | . | . | . | . | . | . | . | . | . | . | . | . | . |
| Cap Gains @ 10% | . | . | . | . | . | . | . | . | . | . | . | . | . | . | . | . | . |
| R-Penalty at sale | (40.00) | (40.00) | (40.00) | (40.00) | (40.00) | (20.00) | (20.00) | (20.00) | (20.00) | (10.00) | (10.00) | (10.00) | (10.00) | . | . | . | . |
| Cumulative Value | 160.00 | 164.22 | 168.44 | 172.67 | 176.89 | 199.00 | 201.11 | 203.22 | 205.33 | 216.39 | 217.44 | 218.50 | 219.56 | 229.56 | 229.56 | 229.56 | 229.56 |

*FIG. 11C*

Financial Simulation with Stable Share Values: R-Penalty = 30 – 0%

DECREASING R-PENALTY RATE AND STABLE R-SHARE PRICE

| R-PENALTY % | 30.0% | | | | 15.0% | | | | 7.5% | | | | 0% | | | |
|---|---|---|---|---|---|---|---|---|---|---|---|---|---|---|---|---|
| TIME | T1 | T2 | T3 | T4 | T5 | T6 | T7 | T8 | T9 | T10 | T11 | T12 | T13 | T14 | T15 | T16 |
| Shareholders | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 | 1,000,000 |
| Price/Share | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 | 20.00 |
| Shares Sold Volume | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 | 100,000 |
| R-Penalty per Share | 6.00 | 6.00 | 6.00 | 6.00 | 3.00 | 3.00 | 3.00 | 3.00 | 1.50 | 1.50 | 1.50 | 1.50 | 0.00 | 0.00 | 0.00 | 0.00 |
| R-Penalty Pool | 600000 | 600000 | 600000 | 600000 | 300000 | 300000 | 300000 | 300000 | 150000 | 150000 | 150000 | 150000 | 0 | 0 | 0 | 0 |
| R-Penalty/Holder of Record | 0.667 | 0.667 | 0.667 | 0.667 | 0.333 | 0.333 | 0.333 | 0.333 | 0.167 | 0.167 | 0.167 | 0.167 | 0.000 | 0.000 | 0.000 | 0.000 |
| | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 |
| INVESTOR 4 EXAMPLE | | | | | | | | | | | | | | | | |
| Shares Held | 10 | 10 | 10 | 10 | 10 | 10 | 10 | 10 | 10 | 10 | 10 | 10 | 10 | 10 | 10 | 10 |
| Holding Value | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 | 200.00 |
| R-Penalty Dividend Received | 6.67 | 6.67 | 6.67 | 6.67 | 3.33 | 3.33 | 3.33 | 3.33 | 1.67 | 1.67 | 1.67 | 1.67 | 0.00 | 0.00 | 0.00 | 0.00 |
| Value at end of Period | 206.67 | 206.67 | 206.67 | 206.67 | 203.33 | 203.33 | 203.33 | 203.33 | 201.67 | 201.67 | 201.67 | 201.67 | 200.00 | 200.00 | 200.00 | 200.00 |
| Cumulative R-Dividend | 6.67 | 13.33 | 20.00 | 26.67 | 30.00 | 33.33 | 36.67 | 40.00 | 41.67 | 43.33 | 45.00 | 46.67 | 46.67 | 46.67 | 46.67 | 46.67 |
| Taxes on R-Dividends @5% | -0.33 | -0.67 | -1.00 | -1.33 | -1.50 | -1.67 | -1.83 | -2.00 | -2.08 | -2.17 | -2.25 | -2.33 | -2.33 | -2.33 | -2.33 | -2.33 |
| Gain (Loss) To Date | . | . | . | . | . | . | . | . | . | . | . | . | . | . | . | . |
| Cap Gains @ 10% | . | . | . | . | . | . | . | . | . | . | . | . | . | . | . | . |
| R-Penalty at sale | (60.00) | (60.00) | (60.00) | (60.00) | (30.00) | (30.00) | (30.00) | (30.00) | (15.00) | (15.00) | (15.00) | (15.00) | . | . | . | . |
| Cumulative Value | 146.33 | 152.67 | 159.00 | 165.33 | 198.50 | 201.67 | 204.83 | 208.00 | 224.58 | 226.17 | 227.75 | 229.33 | 244.33 | 244.33 | 244.33 | 244.33 |

FINANCIAL INSTRUMENT AND RELATED BUSINESS METHOD

RELATED APPLICATION

The present invention claims priority to U.S. Provisional Application No. 60/525,518 filed Nov. 26, 2003 and entitled "Financial Business Method" and is incorporated herein by reference in its entirety.

BACKGROUND OF THE INVENTION

1. Technical Field

The present invention relates to a financial instrument of an entity and a related business method.

2. Related Art

A large portion of investment risk that an individual faces when buying a financial security, and/or risk a corporation experiences when issuing the financial security for raising capital, is based upon the volatility of that investment being purchased or issued. Thus, there is a need for a mechanism to decrease the risk associated with a financial security, and/or risk a corporation experiences when issuing the financial security for raising capital.

SUMMARY OF THE INVENTION

The present invention provides a financial instrument of an entity, said financial instrument comprising: a conventional investment instrument; a penalty feature added to the conventional investment instrument; and a dividend feature added to the conventional investment instrument, said penalty feature characterized by a penalty assessed against a holder of at least one share of the financial instrument who sells the at least one share on a date of sale that precedes an extinguish date associated with the financial instrument, said dividend feature characterized by a dividend adapted to be distributed, on a date subsequent to the date of sale, to all Holders of Record of the financial instrument on the date of sale, said dividend being derived from said penalty, said financial instrument adapted to be acquired by a plurality of investors.

The present invention provides a business method, comprising defining a financial instrument of an entity; and generating shares of the financial instrument, said defining the financial instrument being subject to:

said financial instrument comprising a conventional investment instrument, a penalty feature added to the conventional investment instrument, and a dividend feature added to the conventional investment instrument said penalty feature characterized by a penalty assessed against a holder of at least one share of the financial instrument who sells the at least one share on a date of sale that precedes an extinguish date associated with the financial instrument, said dividend feature characterized by a dividend adapted to be distributed, on a date subsequent to the date of sale, to all Holders of Record of the financial instrument on the date of sale, said dividend being derived from said penalty, said financial instrument adapted to be acquired by a plurality of investors.

The present invention advantageously provides a mechanism to decrease the risk associated with a financial security, and/or risk a corporation experiences when issuing the financial security for raising capital.

BRIEF DESCRIPTION OF THE DRAWINGS

FIG. 2 depicts a T-Accounting associated with the R-Share transactions of FIG. 1, in accordance with embodiments of the present invention.

FIG. 3 is a tabulation of an exemplary R-Share transaction sequence representing an extension in time in relation to FIG. 1, in accordance with embodiments of the present invention.

FIG. 4 illustrates a balance sheet comparison of a company using R-Shares financing with a company using only conventional debt and equity, in accordance with embodiments of the present invention.

FIG. 5 illustrates an income statement comparison of a company using R-Shares financing with a company using only conventional debt and equity, in accordance with embodiments of the present invention.

FIGS. 6-11 depict tables showing the results of financial simulations for comparing the cumulative value of common stock with the cumulative value of R-Shares as a function of time for various combinations of share price trend and R-Penalty percent, in accordance with embodiments of the present invention.

DETAILED DESCRIPTION OF THE INVENTION

Figure 1:
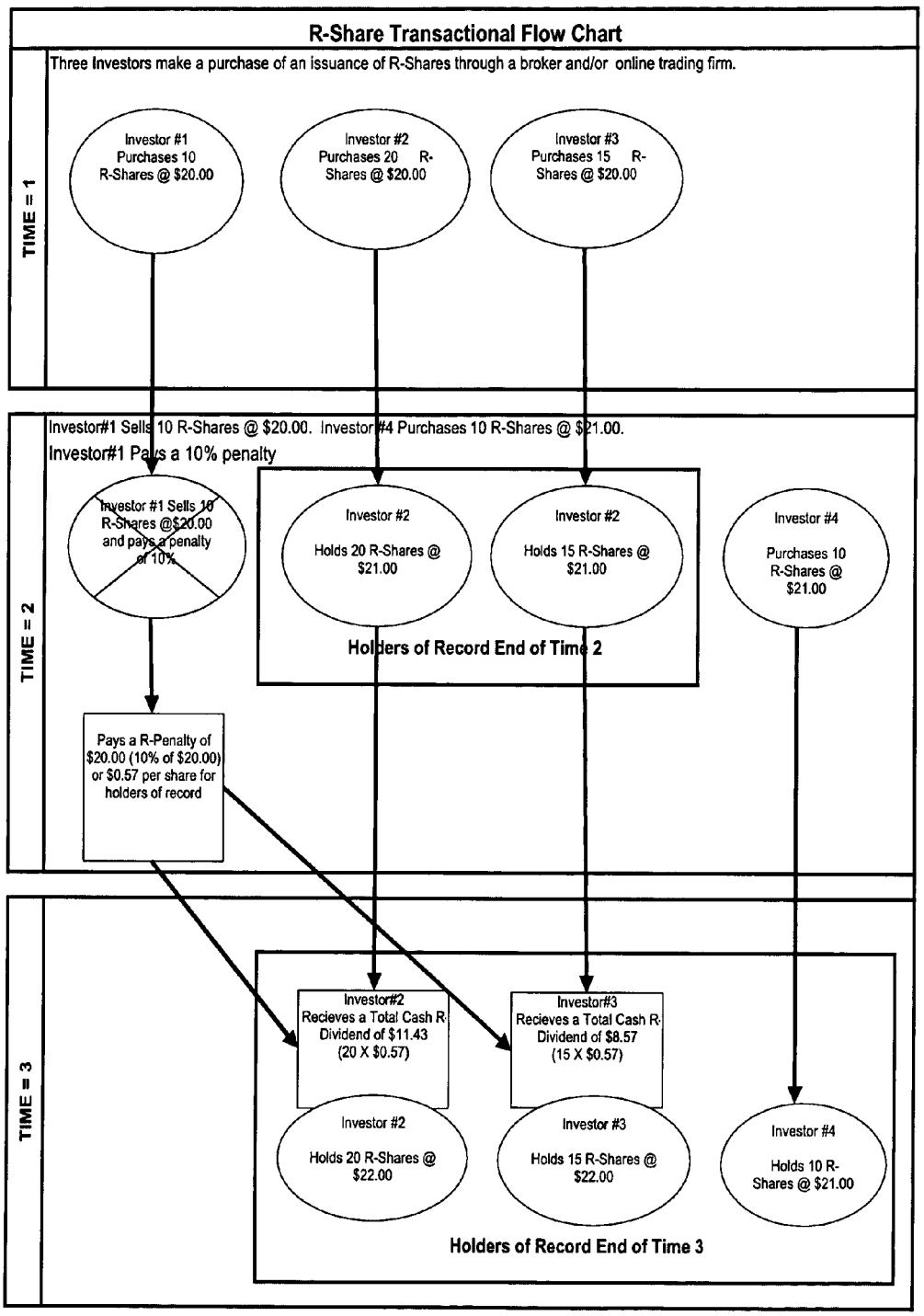
FIG. 1 is a flow chart of an exemplary R-Share transaction sequence, in accordance with embodiments of the present invention.

The present invention discloses a financial instrument, called "R-Shares", that provides an equity or debt ownership position in an entity. Such an entity may comprise, inter alia: a company (e.g., corporation, a partnership, etc,); a governmental entity (e.g., a city, state, federal government, etc.); a credit union; etc. R-Shares like conventional financing would represent ownership in the entity while rewarding R-Shareowners with R-Dividends comprising the R-Penalties (back-end fees), collected from those R-Shareowners who sell the same financial instrument during a specific time frame.

The following definitions apply to the description herein of the present invention.

Issuer—the entity issuing or using R-Shares as a source of financing

R-Shareholder—a holder of R-Shares.

R-Penalties—the backend fee collected from those R-Shareholders who sell the R-Share during a specific time frame.

R-Dividends—the income that results from the R-Penalties received from the sellers of R-Shares during a specific time frame at a prior time.

Holder of Record—an R-Shareholder who is eligible to collect R-Dividends resulting from R-Penalties paid on the Payable Date in accordance with prior Relinquish Dates. An R-Shareholder becomes a Holder of Record just after the closing of the market on the date that the R-Shareholder purchased the R-Shares if there is no initial holding period from the date of purchase during which the R-Shareholder is ineligible to collect R-Dividends. If such an initial holding period exists, then the R-Shareholder becomes a Holder of Record on the date following elapse of the initial holding period.

Holding Period—the period of time required before a R-Shareholder must stay invested before the R-Shareholder is able to collect R-Dividends.

Declaration Date—the date upon which the board of directors of the entity announces to the shareholders and the market as a whole the R-Penalty rates that will determine R-Dividends.

Exempt Period—the period of time after a purchase where no R-Dividends would be payable.

Exempt Date—the date marking a period of time after a purchase where no R-Dividends would be payable.

Extinguish Date—the date on or after which the R-Shareholder no longer has to pay an R-Penalty at time of sale of the R-Shares. After the Extinguish Date, the R-Shareholder may sell the R-Shares without incurring an R-Penalty. The Extinguish Date is applicable to embodiments in which the R-Penalty can be eliminated. The Extinguish Date may be a predetermined date that is fixed or alternatively be determined by a trigger as explained infra.

Payable Date—the date on which the issuer (e.g., company) is required to pay the R-Dividend that is are due to the R-Shareholders who were Holders of Record on the Relinquish Dates that have occurred since the last previous Payable Date. The Payable Dates may be predetermined to occur periodically weekly, monthly, or quarterly.

Record Date—the date on which the investor made the purchase of the R-Share. In the absence of an initial holding period before R-Dividends can be collected, the Record Date serves as the date after which the R-Shareholder could start collecting R-Dividends. The Record Date determines the date at which the R-Shareholder becomes a Holder of Record.

Relinquish Date—the date upon which the R-Shareholder sold the security. On and after the Relinquish Date, the selling R-Shareholder is no longer a Holder of Record.

Sellers of Record—The prior R-Shareholders who sold and who are now ineligible to collect any future R-Dividends The R-Shares of the present invention are an income producing financial instrument to investors who wish to invest for the long term, with the added benefits of piece of mind. The R-Shares provide a security to investors and issuing companies that is less perceptible to manipulation than conventional methods of investment. Accordingly, the present invention is designed to reduce if not eliminate many of the conflicts of interest that many investors face with conventional financial instruments such as stock, bonds, mutual funds, etc. The R-Shares of the present invention also offers companies a mode of raising capital and/or financing debt while promoting the most advantageous use of the companies retained earnings, thus resulting in a lower cost of capital than with conventional modes of raising capital.

The R-Share financial instrument according to the present invention can be issued by any company, developed by an investment banker, and sold to individual investors, mutual fund managers, corporations, municipalities and/or governments. The R-Shares represent a modification of a base financial instrument/conventional security such as, inter alia, common stock, preferred stock, bonds, mutual funds, etc. The R-Shares may use the same common avenues for trading as conventional securities such as, inter alia, public, private exchanges as well as computerized methods. Investors may purchase R-Shares in the same manner as they would purchase any conventional common stock, preferred shares and/or options contract through any approved exchange or over-the-counter market. An investor wanting to buy or sell R-Shares may use the services of a broker or other Securities and Exchange Commission (SEC) licensed individual. Orders would be able to be placed as market orders, limit orders, stop loss orders and/or good-till-canceled orders. In some instances, companies may allow shareholders to purchase shares directly from the company, through dividend reinvestment plans, without having to use a broker.

An R-Share is a product or medium for investment in the form of a share or other percentage unit of ownership in a corporation. More specifically the R-Share would take the form of a "security", its use and purpose of which may be defined and governed by a legal standard such as Article 8 of the Investment Securities section of the Uniform Commercial Code. This R-Shares security would offer investors a mode of investment while offering a source of income that is derived from R-Dividends. The R-Dividends comprise the investor funded R-Penalties (backend fees), collected from those who sell the same security during a specific time frame.

An objective for the R-Shares issuer may be to prevent early liquidation and keep invested capital for a longer time period and to achieve a net capital funding advantage over the longest period of time. R-Shares promote the issuer's desires to raise capital by offering an attractive financial instrument to holders with the benefit of longer term capital retention and stability.

The R-Shares may provide equal or greater returns for long term investment than do conventional investments and may provide a lower risk, tax advantaged investment than is conventionally available. R-Shares promote the balancing of an investor's desire for capital appreciation and desire for income while also offering the potential to maximize tax benefits.

The R-Share may follow the current rules governing conventional securities. The Securities and Exchange Commissions (SEC) may enforce all rules and processes associated with the R-Shares. The taxation of R-Shares may be developed at the federal and state levels. It may be required that any company considering R-Shares for raising capital be registered and in compliance with SEC which regulates securities trading and their exchanges.

The trading of R-Shares may be implemented on a computerized trading system such as the National Association of Securities Dealers Automated Quotation (NASDAQ®). However, other methods of efficiently administering securities can be easily adapted to the trading of R-Shares.

Brokers or firms registered with the SEC administered NASD National Association of Securities Dealers would be allowed to facilitate in trading of R-Shares between issuers and investors. R-Shares that are publicly traded may be traded at conventional stock exchanges that exist today such as the New York Stock Exchange (NYSE) and the National Association of Securities Dealers Automated Quotation (NASDAQ®). Regardless of the mode, the exchange will allow for verification of the R-Share's current price throughout the business day. Buy and sell orders for publicly held R-Shares may be executed by registered stockbrokers or by use of an electronic system over the internet such as Ameritrade® or E-Trade. The stockbroker or computerized stockbroker/clearinghouse may make purchases or sales on behalf of the R-Share investor. A commission may be due to the broker for the service rendered.

A company intending to issue R-Shares may apply to be traded on one of the exchanges and may receive a one to four letter ticker symbol, depending on the exchange on which it is listed. The ticker symbol may be followed by a three digit number which would represent the current, base or issuing penalty percentage to the tenth of a percent. For example, an R-Shares issuance of Coca Colas carrying an R-Penalty percentage of 10.0% may have the ticker symbol of KO100. Likewise, an R-Share issuance of Pepsin Co. carrying an R-Penalty percentage of 12.5% may have the ticker symbol of PEP125.

R-Shares may be subject to rules governing conventional securities such as stocks. For example, such rules may be based on SEC regulations and guidelines.

Voting rights for R-Shares may be determined by governmental guidelines. Voting rights of R-Share stock may be determined as per prior SEC guidelines as well as may be regulated per the company prospectus. Owners of R-Shares may have the right to vote on company matters. These votes may be cast in a manner similar to the proxy absentee ballots commonly used today.

R-Share holders may have a preemptive right to keep their proportionate ownership of the company. If and when a company offers a new issue of stock to the public, R-Shareholders may have a right to buy new shares to keep their ownership percentage ratio the same as prior to the new issue.

R-Shareholder rights at company liquidation and or bankruptcy may be determined by the shareholders, board of directors, and/or SEC guidelines. These guidelines may dictate the R-Shareholders rights and or "pecking order" to receive distributions of any remaining assets should the corporation go bankrupt and have to sell its assets.

R-Shares can be employed by publicly held companies and privately held companies. In the case of a new company or issue, the company's equity can be entirely comprised of the new R-Shares or the company's equity can be combined with other conventional equity types such as common stock and preferred stock as well as with debt. The new issue of R-Shares may be offered, administered and governed in the same manner as a conventional Initial Public Offering (IPO). The R-Shares may be provided for purchase through a stock broker, through a private stock exchange, through a private transaction, through an electronic exchange such as NASDAQ, through an IPO, etc. A prospectus may be offered to all potential R-Shares investors. The prospectus may comprise legal details important to an offering and may include the offering price, legal details, company background, key management, uses of capital raised, and other risks costs associated with the proposed investment. The issuer (e.g., corporation) may hire an investment banker to begin the underwriting process and to act as the liaison between the issuer and the public.

In the case of an existing company, R-Shares can be issued in a number of ways. Investors can designate their existing conventional shares as R-Shares in a specific account (i.e., IRA). New investors could request that new shares purchased are designated as R-Shares. For both cases (i.e., new company and existing inventors) the R-Shares could be designated to be later convertible into conventional equity in a predetermined way. For a company already using conventional equity and debt financing, the company's board of directors could vote on the "reorganization" of the capital of the company so that a significant portion of the company's equity position comprises R-Shares. The issuing company may also have the right to cancel the R-Penalty provision at any time. The issuing company may also have the right to call the R-Shares (i.e., redeem the R-Shares for payment at a predetermined price) at any time, wherein there would be no R-Penalty associated with the R-Shares called.

In the case of and existing companies wanting to employ the use of R-Shares, a secondary offering of R-Shares may be used when the company wants to raise more capital for growth and/or other expansion.

The administration and tracking of R-Dividends may be implemented in various ways such as, inter alia, through the use of sophisticated computing devices and/or network(s). In addition, existing methods of tracking dividend recipients and coupon payments for other types of financial instruments can be easily adapted to this invention.

Figure 15:
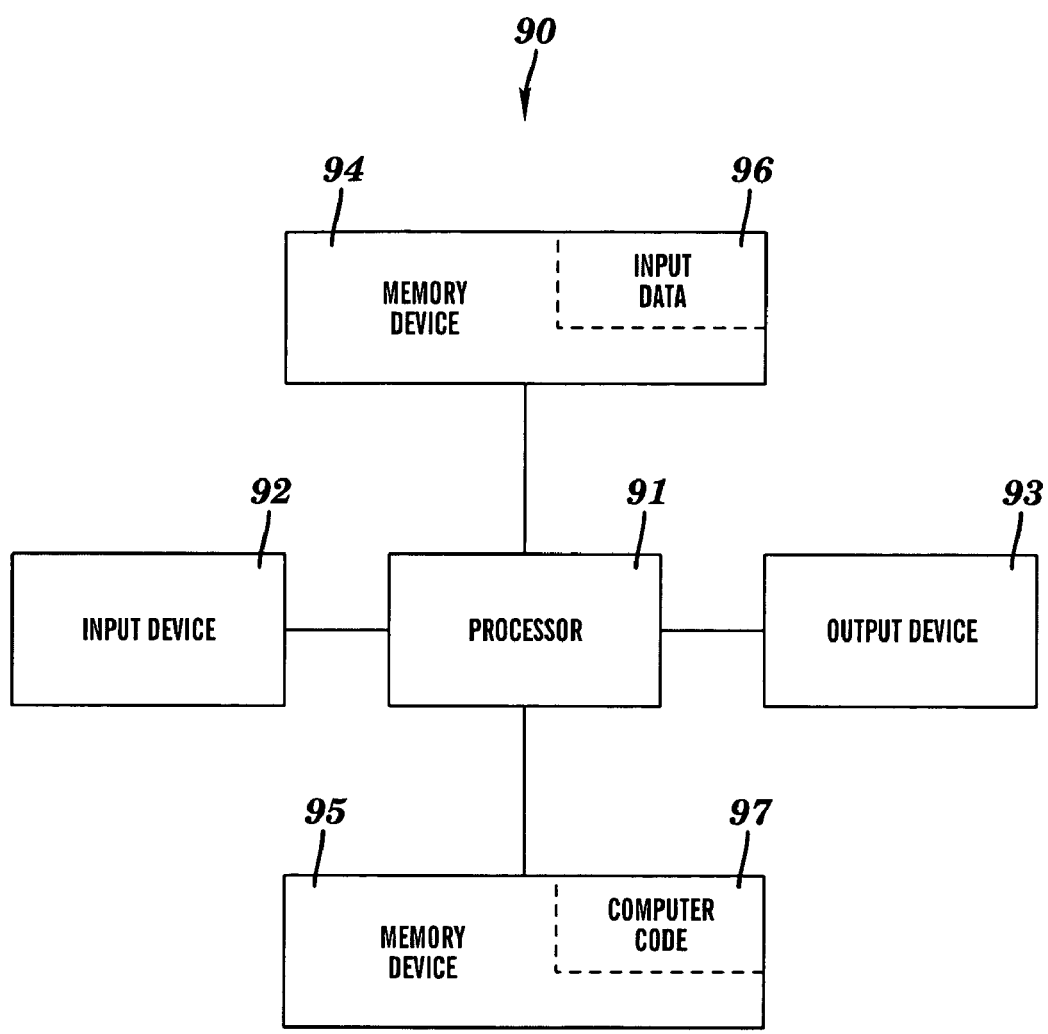
FIG. 15 illustrates a computer system used for implementing R-Shares related activities, in accordance with embodiments of the present invention.

Accordingly, administering and/or tracking aspects of the R-Shares may be implemented by executing computer-readable code on a processor of a computer system such as the computer system of FIG. 15 described infra, wherein said aspects may include: 1) occurrences of the penalty and the dividend; 2) purchases and sales of the financial security; 3) accounting and bookkeeping relating to the purchases, sales, penalty, and dividends, and 4) combinations thereof.

Regardless of the administration method employed, each share or block of R-Shares may be assigned a unique identification number which will aid in R-Dividend distribution, as well as in calculating the required R-Penalty paid during a sale. These R-Penalty and R-Dividend calculations may be determined by the R-Penalty schedules and a subset of the following dates as defined supra: Relinquish Date, Declaration Date, Exempt Date, Extinguish Date, Record Date, and Payable Date.

The preceding dates would be used to make sure that R-Dividend payments go to the correct R-Shares investors. The R-Share stocks may use the same T-3 settlement procedure that conventional dividend paying common stocks use. In other words, it may take three days from the Record Date for the change to be entered into the company's record books and therefore if the transaction is not in the company's record books on the Record Date, the R-Shareholder will not receive the R-Dividend payments. R-Dividends will be determined by tracking the number of shares sold at each scheduled level. For example, the R-Dividend is derived from the R-Penalty such that the R-Shareholders, who are recorded holders (i.e., Holders of Record) at the time of R-Share sales by other investors, will be entitled to the R-Dividends due as derived from the R-Penalties that were paid. A portion of the dividend that is distributed to each Holder of Record may be proportional to the number of R-Shares held by each Holder of Record on the date of sale. All of the R-Penalty may be transformed into the R-Dividend. Alternatively, a percentage less than 100% of the R-Penalty may be transformed into the R-Dividend such that a non-distributed portion of the R-Penalty may be utilized by the issuer (e.g., corporation) for any desired business purpose. Those R-Shareholders who sell their R-Shares may be exempt from receiving any R-Dividends after the date of sale of the R-Shares.

The R-Penalty may be determined by a number of factors including a R-Penalty schedule enacted in the company proxy. The R-Dividends may be based on a R-Penalty percentage value that was decided on before hand by the issuer's current owners, board of directors and/or shareholders or specific investment plan. The R-Penalties can carry various schedules tailored to meet the investor's and/or company's specific needs. Some of the choices for the R-Penalty are as follows:

1) The R-Penalty may be a flat percentage that never changes. For example, a flat 10% R-Penalty would be due at each sale throughout the duration of R-share ownership.

2) The R-Penalty may be scheduled in a graduated decreasing or increasing percentage that changes over time. For example, in an Initial Public Offering (IPO) the R-Penalty percentage may start out as 30% to inhibit sales and stabilize capital. This R-Penalty percentage might drop from the initial 30% to 10% at some point in future time when the company becomes more established and the need for stability is not as critical.

3) The R-Penalty may be based upon the original basis for the investor, split adjusted if applicable. For example, if the investor bought an R-Share at $10 with a 10% penalty and in a year's time the R-Share price appreciated to $30 and did a 2 for 1 R-Share split, the investor would have 2 R-Shares at $15. Under this case, the investor would only pay a $1 penalty (10% of $10) instead of the previous example where the penalty would be $3 or (2 times 10% of $15).

4) The R-Penalty may be calculated based upon a specific formula of common economic indicators, indexes, and/or floating interest rates. For Example, the R-Penalty rates could be a certain percentage rate plus a particular Treasury-Bill rate.

5) The R-Penalty may be extinguished after a predetermined time frame or maturity date. After elapse of a specific period of holding the R-Shares, the R-Penalty might be removed for the long-term holder, while any new investors may still be required to follow the predetermined penalty schedule. Expiration of said specific period of holding the R-Shares may determine the Extinguish Date. For example, the R-Penalty rate may be extinguished after 2 years of ownership. If the penalty happens to expire, the R-Shareholders would be given the opportunity to exercise the R-Share without paying a penalty. The specific period of holding the R-Shares may be a multiple of years or quarters of years.

6) The R-Penalty may be reduced, increased, or extinguished as determined by a specified trigger. For example, the R-Penalty might be increased after a merger or decreased when the share price reaches a certain capitalization rate. The Extinguish Date may be determined by said trigger.

7) The R-Penalty may be configured as a combination of the schedules mentioned in 1)-6) supra, or the R-Shares may be designated to be later convertible into a conventional equity at some period of time in a predetermined way.

Those who invest in R-Shares may be constrained to certain holding requirements. For example, a requirement may exist where only those who continue to stay invested past a predetermined holding period will be eligible to collect the R-Dividend. Additionally, a requirement may exist where only those R-Shareholder who hold a specified minimum number of R-Shares, or a specified minimum aggregate market value of R-Shares, would be able to collect R-Dividends. Likewise, after a specific holding period, the penalty might be removed for the long term holder, whereas new investors may be still required to follow the penalty schedule.

Because of their promotion of long-term investment, R-shares may be approved for preferential treatment (e.g., preferential tax treatment) over conventional securities. Such preferred tax treatment might include tax incentives or even income tax exclusion. The type of treatment may depend on the profile of the investor and the holding period of the investment. R-Shares may benefit from future federal laws, SEC regulation, or any other similar legal development, that would give R-Dividends preferential tax treatment. For example, the preferred tax treatment might include a tax credit for the purchase of R-Shares, exclusion of R-Dividend income, reduced tax rate on R-Dividend income and/or capital gain due to profit resulting from the sale of R-Shares, etc.

FIG. 1 is a flow chart of an exemplary R-Share transaction sequence, in accordance with embodiments of the present invention. The transactions occur at three points in time denoted as Times=1, Times=2, and Times=3, in arbitrary units of time (e.g., days, weeks, months, etc.). The following assumptions are made in FIG. 1: 1) there are 45 R-Shares of no-par value stock; the issuing R-Share price at Time=1 is $20; the R-Penalty is 10% of the original purchase price; there is no holding period before R-Dividends can be received; and all shares sold by one investor are purchased by another investor.

FIG. 2 depicts a simplified version of the T-Accounting associated with the R-Share transactions of FIG. 1, in accordance with embodiments of the present invention. In FIG. 2, T-Accounting A and B pertain to the transactions at Time=1, T-Accounting C and D pertain to the transactions at Time=2, and T-Accounting E and F pertain to the transactions at Time=3.

At Time=1, FIG. 1 shows that three investors (Investor #1, Investor #2, Investor #3) purchase R-Shares in the open market at a price of $20/share. Investor #1 purchases 10 R-Shares at $20/share for a total cost of $200, Investor #2 purchases 20 R-Shares @$20/share R-Shares at a price of $20/share, and Investor #3 purchases 15 R-Shares at $20/share for a total cost of $300.

At Time=1, FIG. 2 shows that for each investor buying an R-Share, the issuing company (T-Accounting A) debits Cash and credits the R-Share Stock Account. Investors #1, #2, and #3 each credits its Cash Account and debit its R-Share Stock Account by the dollar value of the R-Shares transaction (T-Account B). Additional accounts may be needed here as well for certain companies; however these changes will be evident and able to be adapted to comply by one skilled in corporate accounting.

At Time=2, FIG. 1 shows that Investor #1 sells its R-Shares on the open market at $21/share. Therefore, Investor #1 pays a penalty of 10% of the original $200 invested which is $20. Investor #4 purchased those 10 R-Shares on the open market at $21/share. Investor # 4 is not a Holder of Record until after the close of the open market on the date of Time=2.

At Time=2, FIG. 2 shows that at the sale, the issuing company (T-Accounting C) credits Cash for the portion of the stock sale proceeds less the penalty and the issuing company debits the R-Share Stock Account. The issuing company also debits the R-Dividend Escrow Account for the R-Penalty Retained and credits the R-Dividend Payable Account for the same amount. The R-Penalty may be placed in an outside administered and insured escrow account. The Escrow Accounts may be held in a low risk interest bearing account such as U.S. Government securities and/or money market funds. Investor #1 debits its Cash Account and credits its R-Share Stock Account, whereas Investor #4 credits its Cash Account and debits its R-Share Stock by the dollar value of the R-Shares transaction (T-Account D).

At Time=3 which is a Payable Date, an R-Dividend is paid to the Holders of Record on the prior Relinquish Date at Time=2, resulting in Investor #2 and Investor #3 receiving an R-Dividend of $11.43 and $8.57, respectively. The R-Dividend per share is calculated as the R-Penalty of $20 collected from Shareholder # 1 (in conjunction with Shareholder #1's sale of 10 R-Shares at Time=2) divided by the 35 shares held by Holders of Record at the closing of the open market on the date of Time=2. Thus, the R-Penalty is $0.57 per share. In this example, only Investor#2 and Investor#3 were due an R-Divided, since both Investor #1 and Investor#4 was not a Holder of Record at the time of close of the open market on the date of Time=2. The R-Share price at Time=3 is $22.

At Time=3, FIG. 2 shows that during payout, the issuing company (T-Accounting E) credits the R-Dividend Escrow Account and debits the R-Dividend Payable Account for each payout made to Investor #2 and Investor #3. Investors #2 and

3 each debit its Cash Account and credits its R-Dividend Receivable Account by the dollar value of the R-Dividend.

The R-Dividend can be payable in many different options including cash, additional R-Shares, common stock, preferred stock, bonds and/or rights such as warrants or options. For example with options, the R-Shareholder may be entitled to buy shares below the R-Share market price or Ex-Penalty price. For Example, if an R-Share price was $10 and the current R-Penalty was 10% then the R-Share holder would be able to use the option rewarded to purchase shares at $9 (Market Price Less R-Penalty Percentage) even though the market share was $10.

FIG. 3 is a tabulation of an exemplary R-Share transaction sequence representing an extension in time in relation to FIG. 1, in accordance with embodiments of the present invention. FIG. 3 includes 8 times, namely the Times 1, 2, . . . , 8. The R-Shares transactions at TIMES 1, 2, and 3 are the same transactions in FIGS. 1 and 3. The directed line sequences each denote a sale of R-Shares. Each directed line sequence comprises a first directed line and a second directed line. The first directed line has an initial end showing the number of shares sold and a terminal end at an arrowhead showing the dollar amount of the R-Penalty. The second directed line has an initial end showing the dollar amount of the R-Penalty a terminal end at an arrowhead showing the associated R-Dividends paid to the Holders of Record. For example, the sale by Investor #1 of 20 R-Shares at Time=2 is illustrated by: the first directed line showing the 20 shares and the associated $20 R-Penalty to Shareholder #1; and the second directed line showing the $20 R-Penalty and the associated R-Dividends of $11.43 and $8.57 paid to Investor #2 and Investor #3, respectively.

Many of the benefits that R-Shares have to offer investors translate to benefits of the issuing company as a stable investment source is also a stable source of raising capital. Furthermore, since an R-Share helps take away many of the conflicts of interest that exists with paying dividends, the bottom line of the issuing company would also be strengthened. The R-Share issuing company's financials would be impacted in a number of ways, as illustrated by FIGS. 4-5 as described infra.

FIG. 4 illustrates a balance sheet comparison of a company using R-Shares financing with a company using only conventional debt and equity, in accordance with embodiments of the present invention. The balance sheet provides information on what the company owns (Assets), what it owes (Liabilities), and the value of the business to its stockholders (Shareholders' Equity). An R-Share issuing company would most likely have an R-Share Dividend Escrow Account, an R-Share Dividend Payable Account and an R-Share Treasury Stock Account. The R-Share Dividend Escrow account would basically be a clearing account for the R-Penalties received and R-Dividends paid. The amount in the R-Share Dividend Escrow account would correlate to the R-Penalty percentage rate, the rate of investor's sales, as well as the length of time that is allowed before paying the R-Dividends. A high R-Penalty rate, large amount of R-Share sellers and/or larger time frame before paying R-Dividends would all contribute to a larger R-Share Dividend Escrow account balance.

Since a company using R-Shares could partially satisfy the investor's needs for income through R-Dividends, the company could therefore pay less in conventional dividends. For this reason it could easily conceived that when comparing the same company using different capital structures (see FIG. 4), the R-Shares company might have more retained earnings left over year after year, hence the larger balance in the R-shares cash and cash equivalents account or other assets if the retained earnings were used for growth.

FIG. 5 illustrates an income statement comparison of a company using R-Shares financing with a company using only conventional debt and equity, in accordance with embodiments of the present invention. A company's income statement is a record of its earnings or losses for a given period. The income statement shows all of the revenues that a company has earned and all of its expenses during a certain time frame. Conventional dividends are paid from the net earnings after taxes and interest. Anything left over is considered Retained Earnings. Retained Earnings are then used for such things as company growth, expansion or accelerated debt payments.

In some cases the net earnings after interest and taxes are not significant enough to pay conventional dividends. In these cases, a company using R-Shares could be able to offer some sort of dividend income in the form of R-Dividends even though there are no earnings. Furthermore, the costs of paying R-Share dividends are much smaller than the cost of paying conventional dividends, because from a company prospective the only costs associated with R-Share dividends are just administrative costs. Since an R-Shareholder may collect both conventional dividends and R-Dividends, the full Dividend Yield of an R-Share stock may be considerable higher than that of conventional common or preferred stock.

FIGS. 6-11 depict tables showing the results of financial simulations for comparing the cumulative value of common stock with the cumulative value of R-Shares as a function of time (at successive times T0, T1, . . . , T16) for various combinations of share price trend (decreasing, increasing, flat) and R-Penalty percent trend (flat, decreasing), in accordance with embodiments of the present invention. FIGS. 12-13 depict graphical comparisons of the cumulative value of common stock with the cumulative value of R-Shares as a function of time for various combinations of share price trend and R-Penalty percent trend as derived from FIGS. 6-11, in accordance with embodiments of the present invention. Table 1 summarizes the share price trend and R-Penalty percent trend for the tables in FIGS. 6-11 and for the graphs in FIGS. 12-13.

TABLE 1

| FIG. (Table) | FIG. (Graph) | Share Price Trend | R-Penalty Trend |
|---|---|---|---|
| 6 (6A, 6B, 6C, 6D) | 12A | Decreasing | Flat |
| 7 (7A, 7B, 7C, 7D) | 12B | Increasing | Flat |
| 8 (8A, 8B, 8C, 8D) | 12C | Flat | Flat |
| 9 (9A, 9B, 9C, 9D) | 13A | Decreasing | Decreasing |
| 10 (10A, 10B, 10C, 10D) | 13B | Increasing | Decreasing |
| 11 (11A, 11B, 11C, 11D) | 13C | Flat | Decreasing |

Figure 12A:
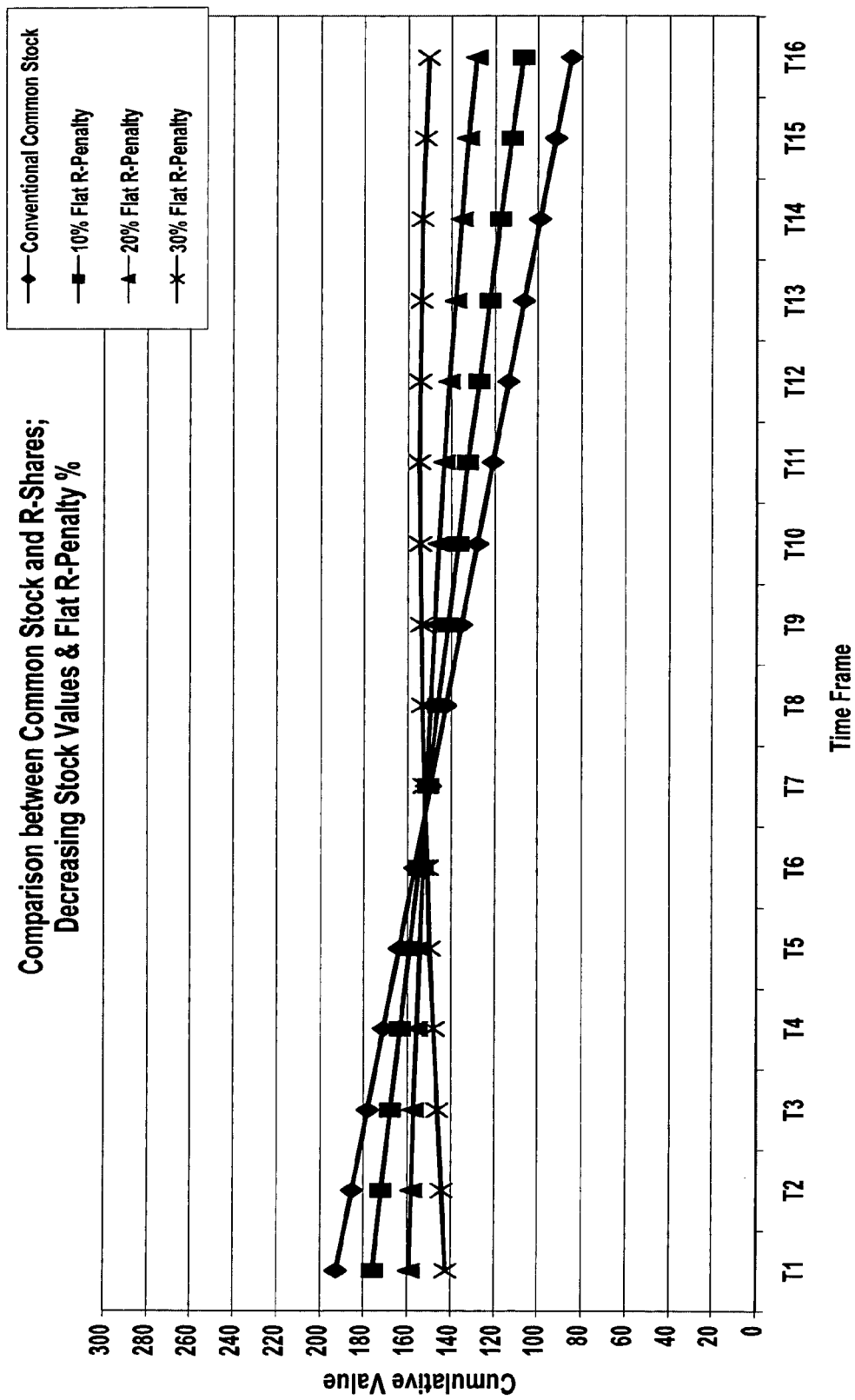
FIGS. 12-13 depict graphical comparisons of the cumulative value of common stock with the cumulative value of R-Shares as a function of time for various combinations of share price trend and R-Penalty percent as derived from FIGS. 6-11, in accordance with embodiments of the present invention.
Figure 12B:
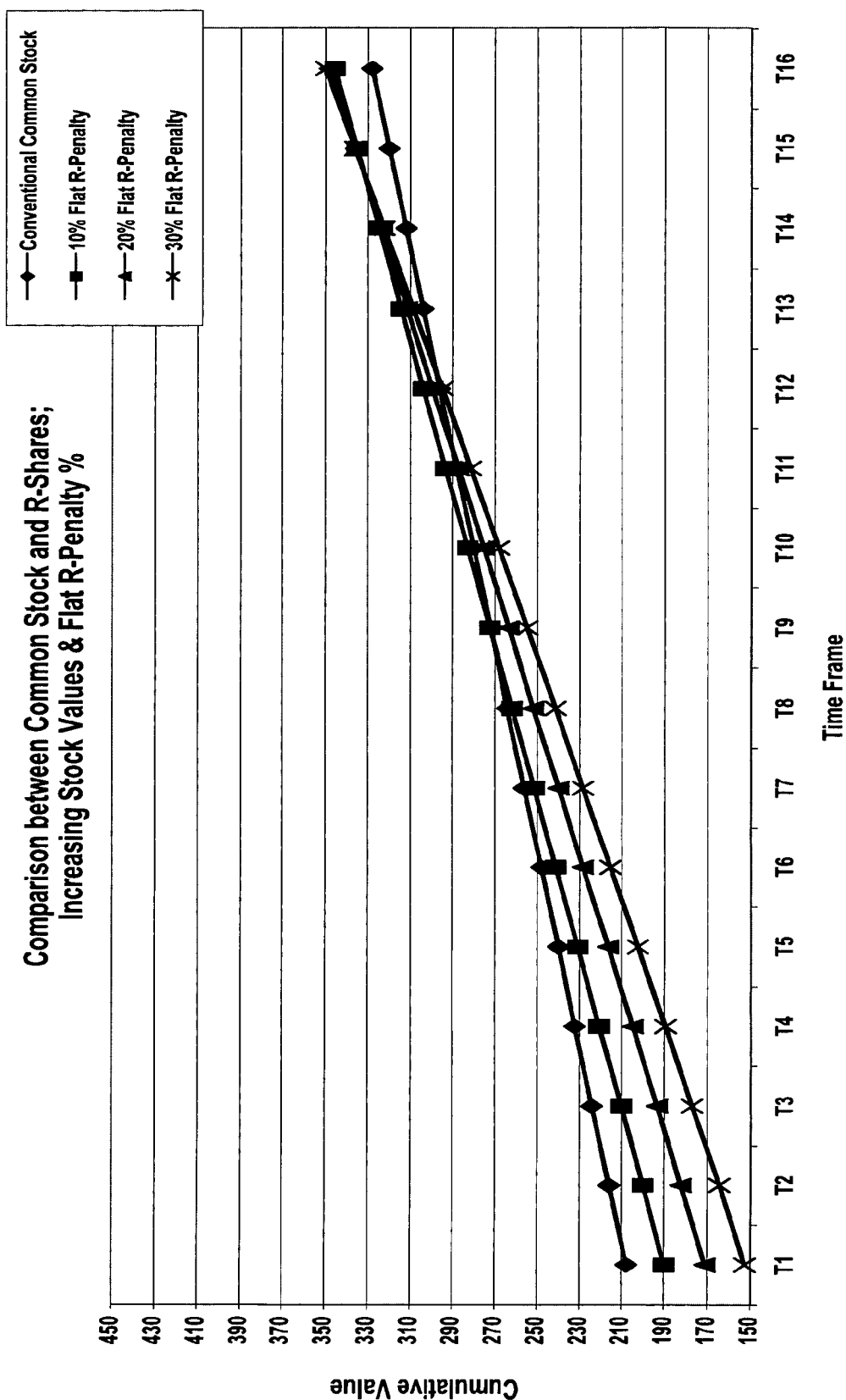
Figure 12C:
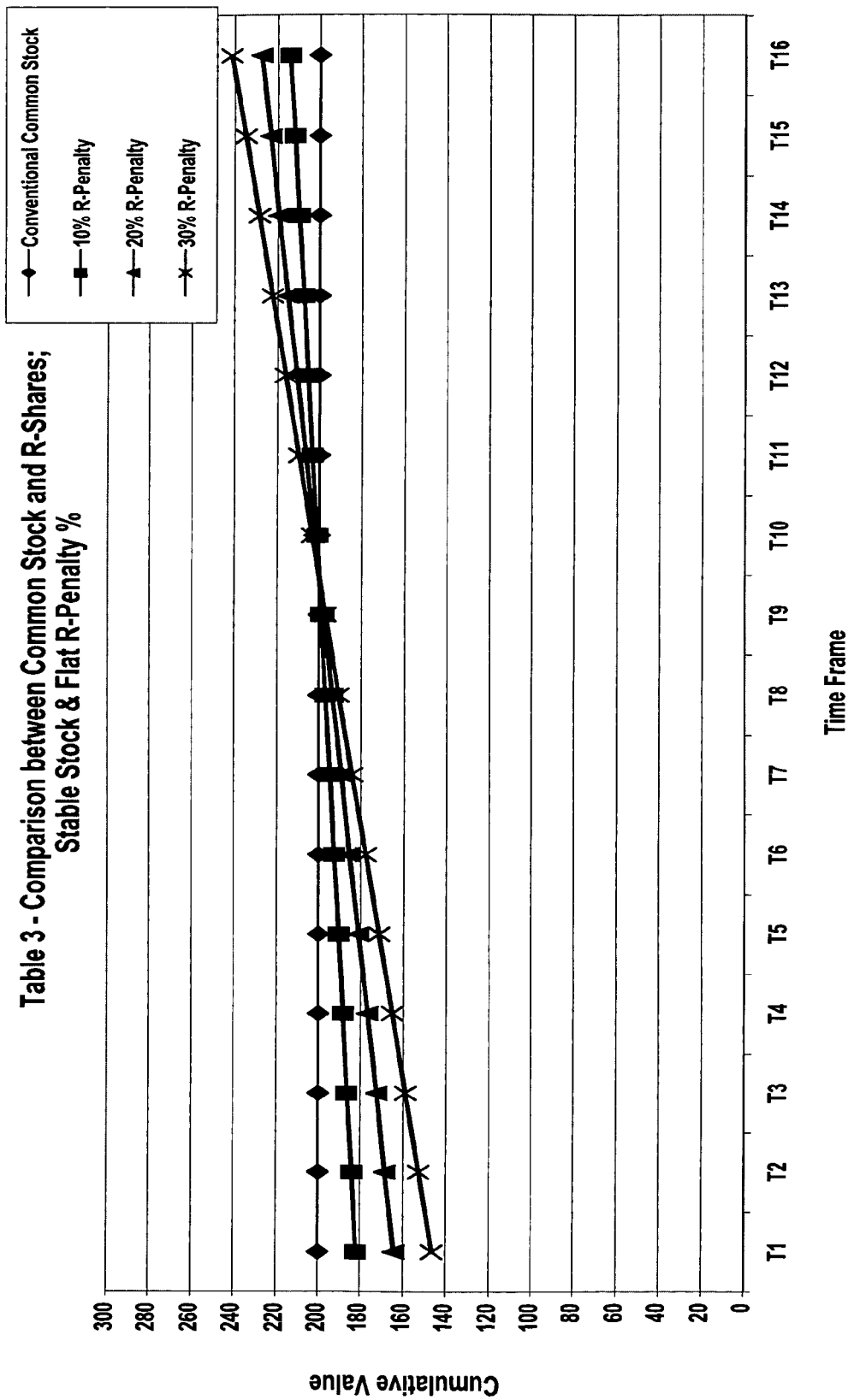
Figure 13A:
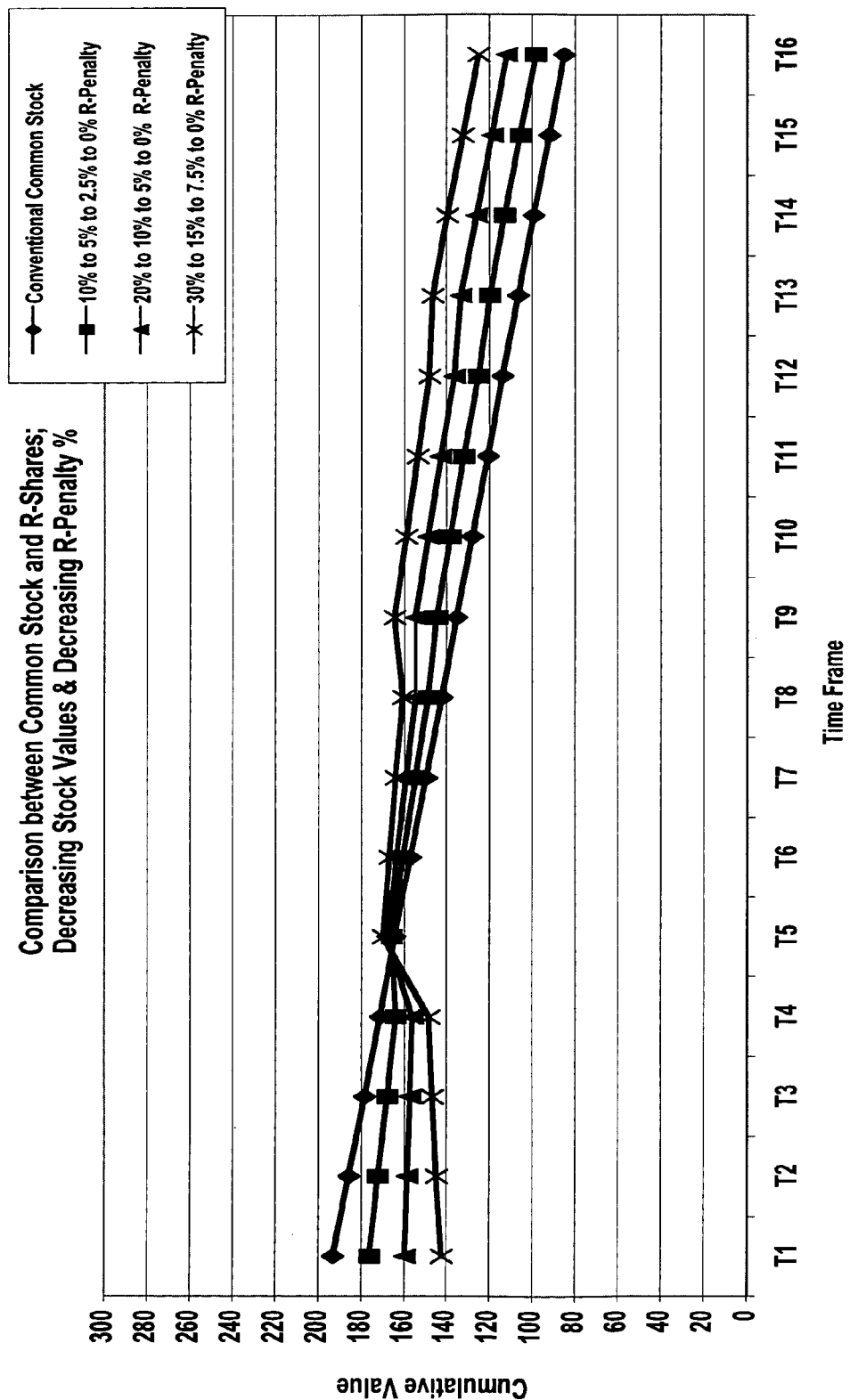
Figure 13B:
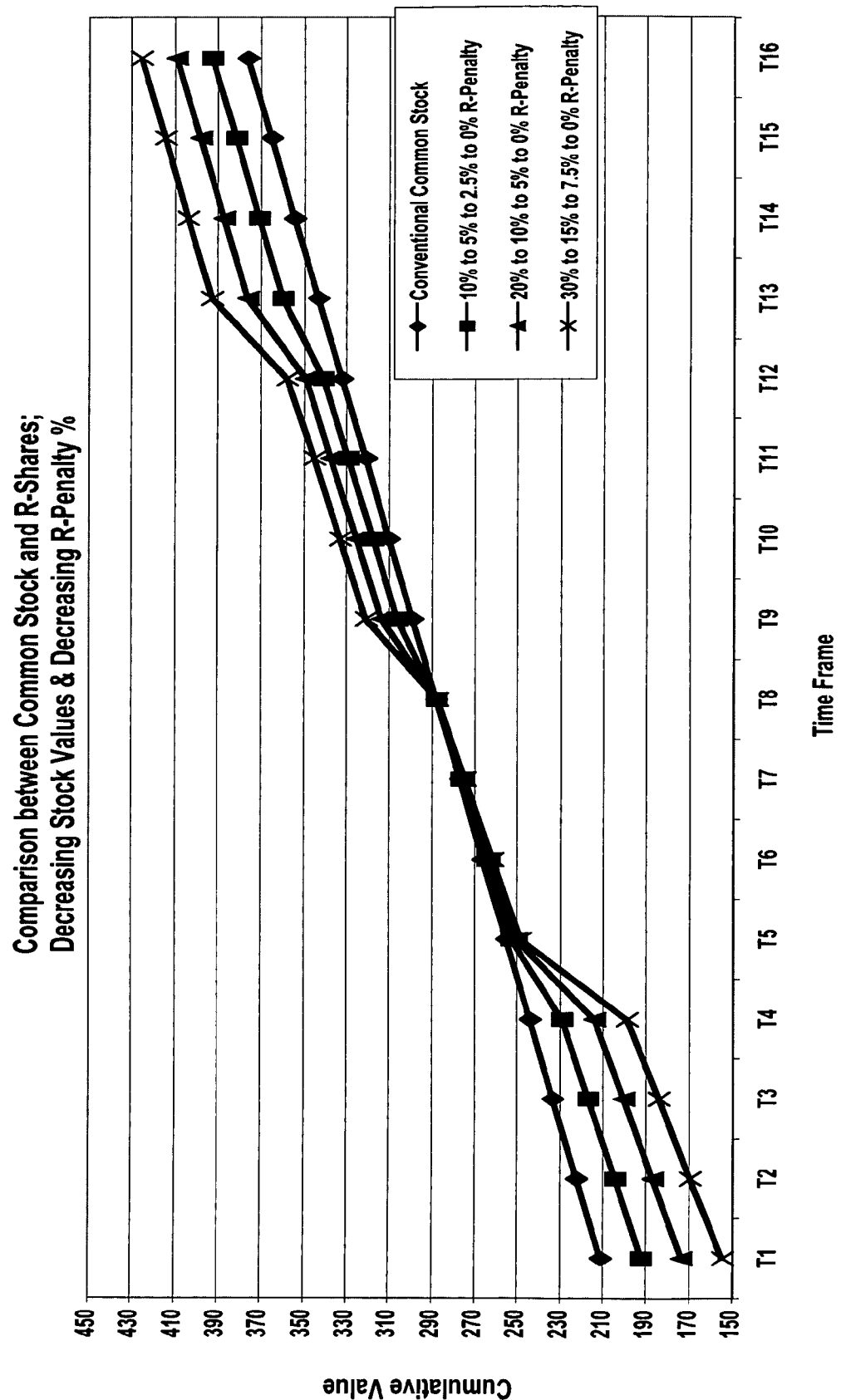
Figure 13C:
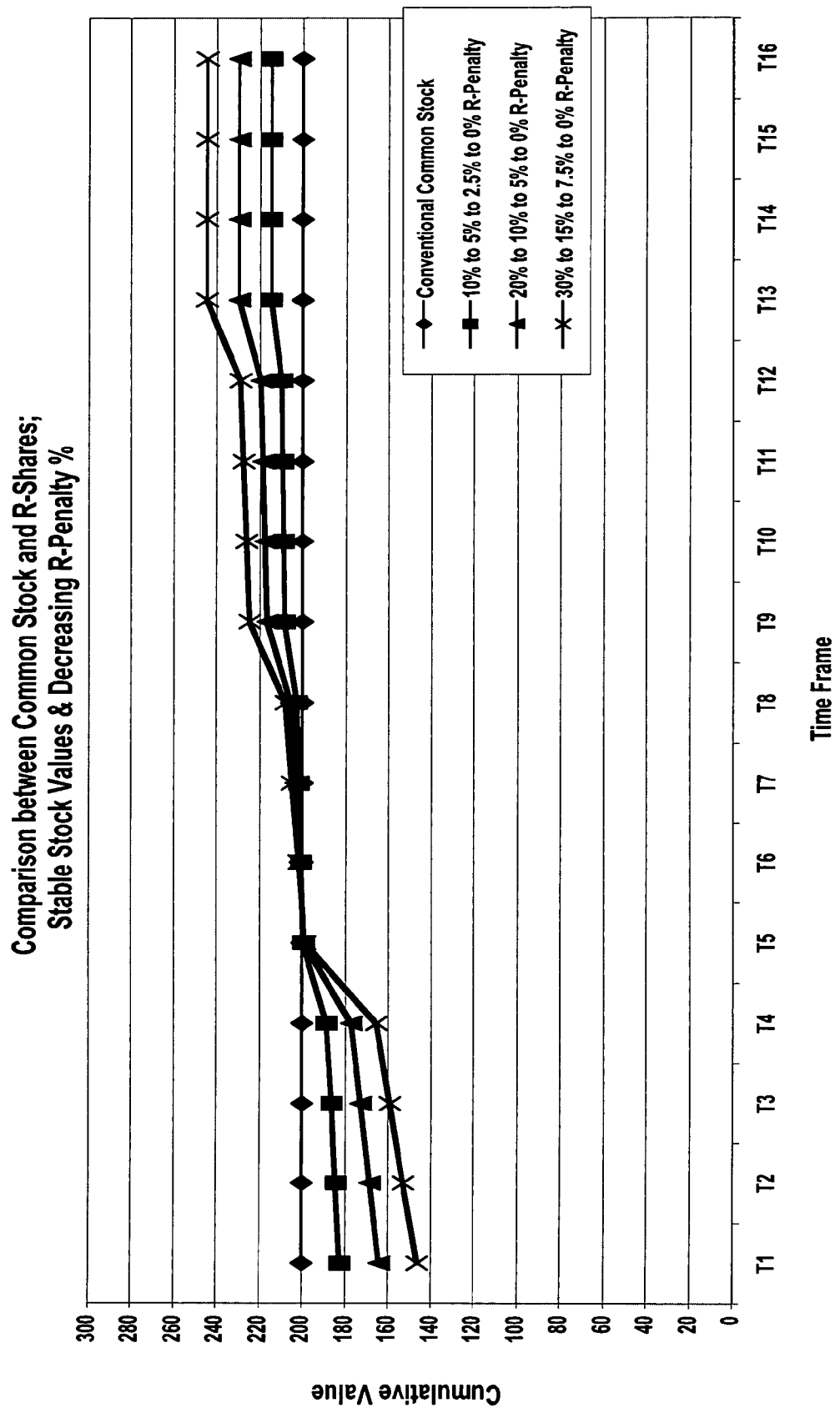

Note that "FIG. 6" denotes FIGS. 6A-6D collectively, "FIG. 7" denotes FIGS. 7A-7D collectively, "FIG. 8" denotes FIGS. 8A-8D collectively, "FIG. 9" denotes FIGS. 9A-9D collectively, "FIG. 10 denotes FIGS. 10A-10D collectively, "FIG. 11 denotes FIGS. 11A-11D collectively, "FIG. 12 denotes FIGS. 12A-12C collectively, and "FIG. 13 denotes FIGS. 13A-13C collectively.

The flat R-Penalties simulated were 0% (conventional stock), 10%, 20%, and 30% as shown. The decreasing R-Penalties simulated were 0% to 0% (conventional stock), 10% to 0%, 20% to 0%, and 30% to 0% as shown.

In the financial simulations, certain variations and conditions that may be experienced in an actual trading environment have been removed for clarification. Table 2 lists assumptions that have been made for the examples represented in FIGS. 6-13.

TABLE 2

Assumptions For Financial Simulations

1. The base company and accompanying financials are the same for both the common stock and R-Share issuances.
2. Time could represent days, weeks or months.
3. Transactions costs or commissions have been omitted.
4. There will be 1,000,000 shares outstanding at Time = 0.
5. The R-Shares will be first issued at $20.00 per share.
6. A decrease in share price will be met with a certain amount of consolidation in the Holders of Record.
7. The supply of R-shares will not be finite; therefore an increase in share price will be met with a slight increase in shares outstanding.
8. There will be an average volume of 100,000 R-Shares bought and sold.
9. R-Dividends will be taxed at 5%.
10. Capital Losses will be written off at 28%.
11. Capital Gains on R-Shares will be taxed at 10%.

In each table of FIGS. 6-11, the first six rows include: "Shareholders" (i.e., number of shareholders), "Price/Share", (i.e., market price/share), "Shares Sold Volume" (i.e., number of shares sold), "R-Penalty per Share" (i.e., R-Penalty Percent×Price/Share), "R-Penalty Pool" (i.e., Shares Sold Volume×R-Penalty per Share), and "R-Penalty per Holder of Record" (i.e., R-Penalty Pool/{Shareholders–Shares Sold Volume}).

In each table of FIGS. 6-11, ten rows are listed pertaining to Investor #4 of FIGS. 1-3. The last (i.e., tenth) row of "Cumulative Value" denotes market value of the 10 shares held by Investor #4 at each time T0, T1, . . . , T16 and is computed as the sum of the following parameters: Holding Value (+), Cumulative R-Dividend (+), Taxes on R-Dividends (−), Loss Tax Credit (+), and R-Penalty at Sale(−), where (+) and (−) respectively denote positive and negative contributions to the Cumulative Value.

FIGS. 12-13 are graphs of Cumulative Value versus Time for the times of T1, T2, . . . T16. Each chart in FIGS. 12-13 comprises four individual plots corresponding to the tables of FIGS. 6-11 as indicated in Table 1 and in the legend of each chart.

A review of FIGS. 12-13 reveals that the Cumulative Value of the conventional stock outperforms the R-Shares in the early time periods but does not fare as well as the R-Shares in the long term. The cross-over time at which the Cumulative Value of the conventional stock and the R-Shares are about equal varies with whether the Share Price Trend is decreasing, increasing, or flat when the R-Penalty Percent trend is flat (FIG. 12), but is relatively insensitive to whether the Share Price Trend is decreasing, increasing, or flat when the R-Penalty Percent trend is decreasing (FIG. 13). The cross-over time is insensitive to the magnitude of the flat R-Penalty Percent (FIG. 12) and is also insensitive to the rate of decline of the decreasing R-Penalty Percent (FIG. 13).

With a flat R-Penalty Percent, the Cumulative Value at the final time T16 is most favorable (i.e., highest) for R-Shares, as compared with conventional stock, in a market of decreasing stock value (FIG. 12A) or of stable (i.e., flat) stock value (FIG. 12C) as compared with a market of increasing stock value (FIG. 12B). As to the Cumulative Value at the final time T16, the increasing stock value market is characterized by significantly less difference between the conventional stock than the R-Shares than in the decreasing or flat stock value markets. With a decreasing R-Penalty Percent, the Cumulative Value at the final time T16 is about equally favorable in all stock value markets (decreasing, increasing, flat) for R-Shares versus conventional stock (FIG. 13) and the R-Shares significantly outperform the conventional stock at time T16. In summary, the R-Shares has the potential to improve Cumulative Value performance relative to conventional stock Cumulative Value performance to a varying degree in all markets and may serve as a Cumulative Value hedge for markets in which the stock price is decreasing.

The financial simulations discussed supra suggest that R-Shares may have significant advantages when compared to conventional securities with equal criteria. Since R-Share securities appear less risky than conventional securities, the R-Shares may be priced at a premium relative to conventional investment alternatives. However, if some of the benefits associated with R-Shares are offset by a R-Penalty that is due at liquidation of the R-Shares, the R-Shares may be priced in the market closer to the conventional stock prices.

Nonetheless, the risk of R-Shares to investors is more limited, since the downside from R-Penalties that an investor owes at sale is compensated by the reduced volatility, R-Dividend income stream, and potential appreciation of the R-Shares.

R-Shares may be used for various applications, including Executive Compensation, Income Production, and Social Security Reform, as discussed next.

As to Executive Compensation, the stock in a company serves many purposes, not only as a way of raising capital but for also as a way of rewarding management for good results. Executive and management pay is often made up of various components, including salary, bonuses and stock options. Studies have shown that companies providing a high level of stock-based incentive compensation to employees deliver a higher total shareholder return on average.

Conceptually, rewarding management with stock options may be a wise idea, since it usually binds the manager's compensation to the future success of the company. The problem arises when provisions are put into place that allow for huge rewards in shorter periods of time. For example, the conflict of interest arises when the stock option rewards have shortened vesting periods, are accelerated or even vest immediately from other trigger events such as if a company goes public or is acquired.

Additionally, numerous companies have been criticized for taking advantage of this policy and for exposing their shareholders returns to huge future liabilities because of their lucrative stock option and restrictive stock compensation programs. Unfortunately, when these stock options are exercised, the issuing companies have to come up with vast sums of capital to buy their stock and give it as compensation. This expense not only has a negative effect on the corporations overall bottom line but also has a dilution effect on the number of shares outstanding. Again this is not very appealing to shareholders.

The lucrative nature of these programs creates quite the dilemma for startup companies trying to recruit and retain good management. In order to compete, the startup companies are forced to give an even bigger percentage of stock options as compensation since the strength of future cash flows is less certain. As a result, the potential for dilution is greater and will eventually have a large negative effect on earnings per share as the numbers of shares outstanding often grows exponentially.

While it is evident that the use of stock options and restricted stock are going to continue, R-Shares provide another vehicle to tie executive compensation to the company's long term performance.

As to Income Production, a large portion of the population (e.g., those who are retired) seek income producing securities. Bonds and high dividend paying equities are often tools for meeting these needs. Unfortunately, bond investors are seeing considerable pressure as the decrease in interest rates have cut considerably into the income potential of these instruments. This is further complicated as the supply of governmental issuance of bonds has been dwindling. Dividend paying equities have also come under pressure as the economy has faced a downturn and operating incomes have also suffered, leaving less to pay toward dividends.

An investor needs to know the company's dividend and retained earnings policies to decide whether the company's objectives are inline with there best interests. The amount of profits a company pays as dividends or retains for future growth form a very important component in securities valuation. If the company pays dividends it is income oriented. If the company retains earnings for future expansion, the company is growth oriented.

Many new companies do not pay dividends, as they are better off investing the profits in projects that will lead to higher returns and larger cash flows in the future and thus higher share appreciation later. If the company cannot earn a higher return on these profits with reinvestments, then they are better off paying out the profits as dividends to shareholders. This in itself could be a conflict of interest, since getting a dividend could imply that the company did not have any better options for reinvestment or company expansion.

The decision to distribute a dividend is often made by a company's board of directors. Nothing, including past dividend payment history, requires a company to pay a dividend. However, most investors view reliable dividend history as good indicator of company health, making most companies very hesitant to reduce or eliminate their dividend payments. While well managed and excellent companies often have a history of increasing dividends, this can also eventually present a conflict of interest if essentially all available earnings are used to pay dividends instead of being reinvested in profitable projects. In this case, the conflict of interest arises because the company must still raise its dividend while either diluting its stock further in a secondary offering and or by issuing debt to fund the project. From an economics and long term standpoint, a company that needs to reinvest or has the potential to reinvest at a high return should not pay out all of its profits in dividends since doing so might slow its potential growth and therefore slow future dividend growth.

R-Shares would help satisfy the investor's need for income while at the same time give the issuing company more flexibility to choose the uses of its profits for growth or for conventional dividend payments. R-Shareholders would receive R-Dividends from the R-Penalties received from sellers of the stock as well as conventional dividends if and when the company was in the position to pay both types. While there is no certainty to a common share dividend, there may be for R-Shares as long as there is trading activity.

As to Social Security Reform, the long term solvency of Social Security has been increasingly questionable in the past few decades. Government policymakers have focused considerable time and effort trying to find ways of making the Social Security's viable on a long term basis. For the past several years there has been a growing consensus about the need to reform Social Security as future retirees will need to find alternative income sources as they age. The significant decline in the amount of companies paying a dividend combined with the decline in the amount of income produced from bonds due to low interest rates has placed considerable pressure on those retirees who require these funds to live on.

The ever-looming problems with Social Security also create a need for an investment income alternative. Some proposals that exist include giving workers ownership and partial control over their retirement funds as well as the creation of individual retirement accounts. The income producing R-Shares by nature promote the long term holding of investments and offer less speculation over conventional securities and therefore might be presented as a vehicle for such reform. Appealing examples of this system might include using Index funds with R-Share feature attached. Furthermore, to further decrease the risk inherent with investment, investors could invest in mutual funds that invest primarily or entirely in R-Share type securities.

Since R-Shares can be considered as a long-term investment, the R-Shares could also become a "qualified" security and be given preferential tax treatment from federal, state and/or local government levels. Thus, R-Shares offer a mode of investment for a potential overhaul of the Social Security system.

While the preceding description of the present invention comprises several specific examples, these examples should not be construed as limitations on the scope of the invention, but rather as an exemplification of embodiments thereof. Many variations are possible, each with the potential to benefit both the investor and issuing company.

Figure 14:
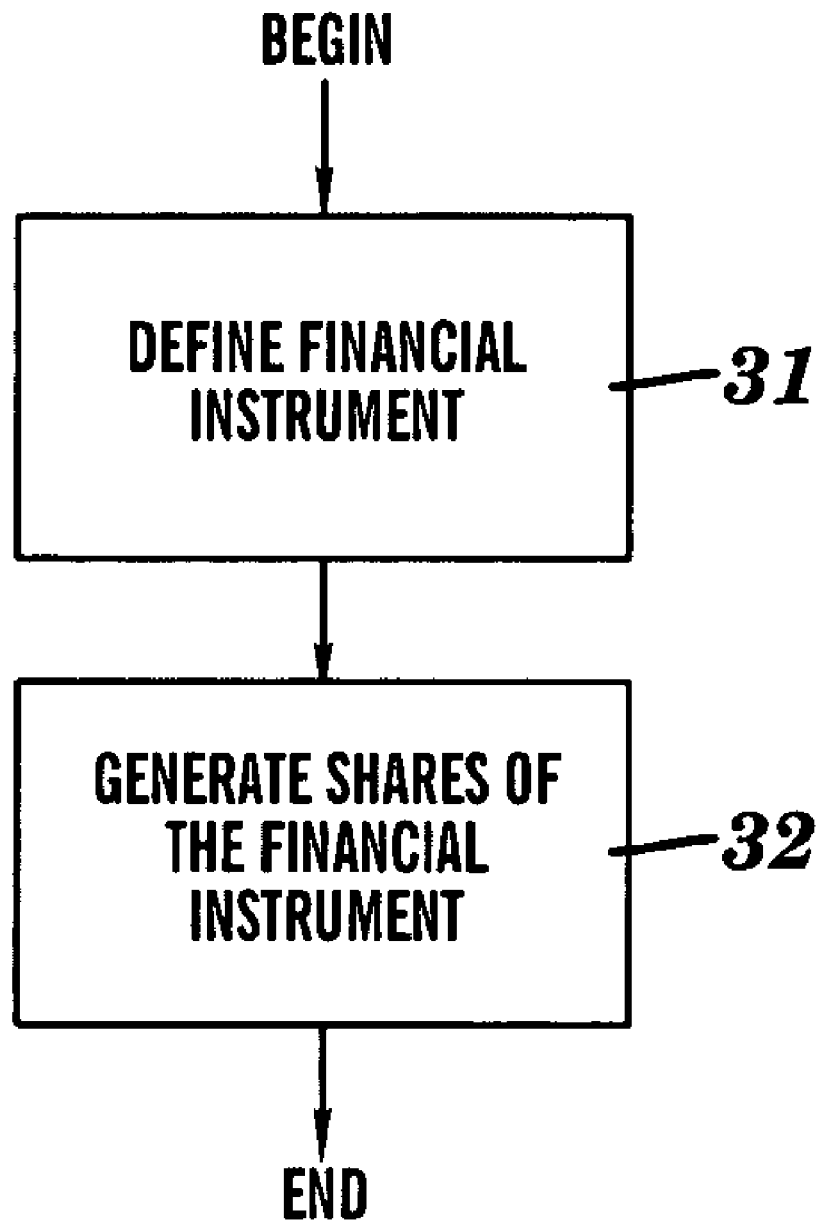
FIG. 14 is a flow chart for describing a business method, in accordance with embodiments of the present invention.

FIG. 14 is a flow chart for describing a business method, in accordance with embodiments of the present invention. The method may be, inter alia, a method for raising capital for an entity, a method for financing debt of an entity, etc. The method described in FIG. 14 comprises steps 31 and 32.

Step 31 defines an R-Shares financial instrument of an entity and step 32 generates shares of the financial instrument. The financial instrument may comprise a conventional investment instrument, a penalty feature added to the conventional investment instrument, and a dividend feature added to the conventional investment instrument. The penalty feature is characterized by a penalty assessed against a holder of at least one share of the financial instrument who sells the at least one share on a date of sale that precedes an extinguish date associated with the financial instrument. The dividend feature is characterized by a dividend adapted to be distributed, on a date subsequent to the date of sale, to all Holders of Record of the financial instrument on the date of sale. The dividend is derived from the penalty. The financial instrument is adapted to be acquired by a plurality of investors.

FIG. 15 illustrates a computer system 90 used for implementing R-Shares related activities as describes supra, in accordance with embodiments of the present invention. Such R-Shares related activities may include, inter alia, administering and/or tracking aspects of the R-Shares may be implemented by executing computer-readable code on a processor of a computer system, wherein said aspects may include: 1) occurrences of the penalty and the dividend; 2) purchases and sales of the financial security; 3) accounting and bookkeeping relating to the purchases, sales, penalty, and dividends, and 4) combinations thereof. Such R-Shares related activities may further include or alternatively include the trading of R-Shares via a computerized trading system such as the National Association of Securities Dealers Automated Quotation (NASDAQ®) or Ameritrade®.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for implementing R-Shares related activities. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 15) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for implementing R-Shares related activities.

While FIG. 15 shows the computer system 90 as a particular configuration of hardware and software, any configuration of hardware and software, as would be known to a person of ordinary skill in the art, may be utilized for the purposes stated supra in conjunction with the particular computer system 90 of FIG. 15. For example, the memory devices 94 and 95 may be portions of a single memory device rather than separate memory devices.

Thus, while embodiments of the present invention have been described herein for purposes of illustration, many modifications and changes will become apparent to those skilled in the art. Accordingly, the appended claims are intended to encompass all such modifications and changes as fall within the true spirit and scope of this invention

What is claimed is:

1. A financial instrument of an entity, said financial instrument comprising: a conventional investment instrument; a penalty feature added to the conventional investment instrument; and a dividend feature added to the conventional investment instrument,
    said penalty feature characterized by a penalty assessed against a holder of at least one share of the financial instrument who sells the at least one share on a date of sale that precedes an extinguish date associated with the financial instrument,
    said dividend feature characterized by a dividend adapted to be distributed, on a date subsequent to the date of sale, to all Holders of Record of the financial instrument on the date of sale,
    said dividend being derived from said penalty,
    said financial instrument adapted to be acquired by a plurality of investors.

2. The financial instrument of claim 1, wherein the entity is a publicly held company, a privately held company, a corporation, or a combination thereof.

3. The financial instrument of claim 1, wherein the conventional investment instrument is a common stock, a preferred stock, a bond of, or a mutual fund.

4. The financial instrument of claim 1, wherein a portion of the dividend that is distributed to each holder of said all Holders of Record is proportional to a number of shares of the financial security held by each holder on the date of sale.

5. The financial instrument of claim 1, wherein the dividend is equal to the penalty.

6. The financial instrument of claim 1, wherein the dividend is less than the penalty.

7. The financial instrument of claim 1, wherein the dividend in is a form selected from the group consisting of cash, shares of the financial instrument, common stock of the entity, preferred stock of the entity, warrants of the entity, options on common stock of the entity, bonds of the entity, a debt instrument of the entity, or another financial instrument or asset of the entity.

8. The financial instrument of claim 1, wherein the penalty is a constant percent of a market value of the at least one share on the date of sale.

9. The financial instrument of claim 1, wherein the penalty is a time-varying percent of a market value of the at least one share over a period of time beginning on a date of purchase of the at least one share by said holder and ending on the date of sale.

10. The financial instrument of claim 1, wherein the penalty is a function of an economic indicator, a market index, a floating interest rate, or a combination thereof.

11. The financial instrument of claim 1, wherein an acquirer of a share of the financial instrument becomes a Holder of Record in relation to said share after elapse of a holding period that begins immediately after a date on which the acquirer acquires said share.

12. The financial instrument of claim 1, wherein an acquirer of a share of the financial instrument becomes a Holder of Record in relation to said share on a date immediately after a date on which the acquirer acquires said share.

13. The financial instrument of claim 1, wherein a holder of shares of the financial instrument cannot be a Holder of Record of said shares unless a condition is satisfied, wherein the condition is that the number of said shares is not less than a specified minimum number of shares or that an aggregate market value of said shares is not less than a specified minimum aggregate market value.

14. The financial instrument of claim 1, wherein the financial instrument is adapted to be regulated by the Securities and Exchange Commission (SEC).

15. The financial instrument of claim 1, wherein an acquirer of shares of the financial instrument receives favorable tax treatment relating to the shares.

16. The financial instrument of claim 1, wherein the financial security is adapted to be traded in a securities exchange or in an over-the-counter market.

17. The financial instrument of claim 1, wherein shares of the financial instrument are adapted to be issued as new shares of the financial instrument.

18. The financial instrument of claim 1, wherein shares of the financial instrument are adapted to be sold privately, through a stock broker, at a public stock exchange, through an electronic stock exchange, through an Initial Public Offering (IPO), or via combinations thereof.

19. The financial instrument of claim 1, wherein shares of the financial instrument are adapted to be generated through conversion of existing shares of the conventional investment instrument into said shares of the financial instrument.

20. The financial instrument of claim 1, wherein aspects of the financial instrument are adapted to be administered and/or tracked via execution of computer-readable code on a processor of a computer system, said aspects being selected from the group consisting occurrences of the penalty and the dividend, purchases and sales of the financial instrument, accounting and bookkeeping relating to the purchases, sales, penalty, and dividends, and combinations thereof.

21. A business method, comprising
defining a financial instrument of an entity,
generating shares of the financial instrument; and
a processor of a computer system transferring the financial instrument to a tangible medium selected from the group consisting of a computer screen, a printer, a data storage medium, and combinations thereof,
said defining the financial instrument being subject to:
said financial instrument comprising a conventional investment instrument, a penalty feature added to the conventional investment instrument, and a dividend feature added to the conventional investment instrument
said penalty feature characterized by a penalty assessed against a holder of at least one share of the financial instrument who sells the at least one share on a date of sale that precedes an extinguish date associated with the financial instrument,
said dividend feature characterized by a dividend adapted to be distributed, on a date subsequent to the date of sale, to all Holders of Record of the financial instrument on the date of sale,
said dividend being derived from said penalty,
said financial instrument adapted to be acquired by a plurality of investors.

22. The business method of claim 21, wherein the entity is a publicly held company, a privately held company, a corporation, or a combination thereof.

23. The business method of claim 21, wherein the conventional investment instrument is a common stock, a preferred stock, a bond of, or a mutual fund.

24. The business method of claim 21, wherein a portion of the dividend that is distributed to each holder of said all Holders of Record is proportional to a number of shares of the financial security held by each holder on the date of sale.

25. The business method of claim 21, wherein the dividend is equal to the penalty.

26. The business method of claim 21, wherein the dividend is less than the penalty.

27. The business method of claim 21, wherein the dividend in is a form selected from the group consisting of cash, shares of the financial instrument, common stock of the entity, preferred stock of the entity, warrants of the entity, options on common stock of the entity, bonds of the entity, a debt instrument of the entity, or anther financial instrument of the entity.

28. The business method of claim 21, wherein the penalty is a constant percent of a market value of the at least one share on the date of sale.

29. The business method of claim 21, wherein the penalty is a time-varying percent of a market value of the at least one share over a period of time beginning on a date of purchase of the at least one share by said holder and ending on the date of sale.

30. The business method of claim 21, wherein the penalty is a function of an economic indicator, a market index, a floating interest rate, or a combination thereof.

31. The business method of claim 21, wherein an acquirer of a share of the financial instrument becomes a Holder of Record in relation to said share after elapse of a holding period that begins immediately after a date on which the acquirer acquires said share.

32. The business method of claim 21, wherein an acquirer of a share of the financial instrument becomes a Holder of Record in relation to said share on a date immediately after a date on which the acquirer acquires said share.

33. The business method of claim 21, wherein a holder of shares of the financial instrument cannot be a Holder of Record of said shares unless a condition is satisfied, wherein the condition is that the number of said shares is not less than a specified minimum number of shares or that an aggregate market value of said shares is not less than a specified minimum aggregate market value.

34. The business method of claim 21, wherein the financial instrument is adapted to be regulated by the Securities and Exchange Commission (SEC).

35. The business method of claim 21, wherein an acquirer of shares of the financial instrument receives favorable tax treatment relating to the shares.

36. The business method of claim 21, wherein the financial security is adapted to be traded in a securities exchange or in an over-the-counter market.

37. The business method of claim 21, wherein generating comprises shares of the financial instrument issuing new shares of the financial instrument.

38. The business method of claim 21, wherein said generating shares of the financial instrument comprises selling of new shares of the financial instrument privately, through a stock broker, at a public stock exchange, through an electronic stock exchange, through an Initial Public Offering (IPO), or via combinations thereof.

39. The business method of claim 21, wherein said generating shares of the financial instrument comprises converting existing shares of the conventional investment instrument into said shares of the financial instrument.

40. The business method of claim 21, wherein the method further comprises administering and/or tracking aspects of said financial instrument by executing computer-readable code on a processor of a computer system, said aspects being selected from the group consisting occurrences of the penalty and the dividend, purchases and sales of the financial instrument, accounting and bookkeeping relating to the purchases, sales, penalty, and dividends, and combinations thereof.

* * * * *

UNITED STATES PATENT AND TRADEMARK OFFICE
CERTIFICATE OF CORRECTION

| | | |
|---|---|---|
| PATENT NO. | : 7,818,225 B2 | Page 1 of 1 |
| APPLICATION NO. | : 10/995790 | |
| DATED | : October 19, 2010 | |
| INVENTOR(S) | : John Gula, IV | |

It is certified that error appears in the above-identified patent and that said Letters Patent is hereby corrected as shown below:

Column 5, line 5, delete "Coca Colas", insert --Coca Cola®--.

Column 5, line 7, delete "Pepsin Co", insert --Pepsi® Co--.

Column 8, line 15, delete "Figure 1", insert --Figures 1 and 2--.

Column 8, line 19, Investor #2 purchases R-Shares at $20/share, delete the second "R share at a price of $20/share", insert --for a total cost of $400.00--.

Column 8, line 61, delete "was", insert --were--.

Column 10, line 26, delete "considerable", insert --considerably--.

Column 13, line 14, delete "there", insert --their--.

Column 17, Claim 27, line 44, delete "in is", insert --is in--.

Column 17, Claim 27, line 48, delete "anther", insert --another--.

Signed and Sealed this
Twenty-second Day of February, 2011

David J. Kappos
*Director of the United States Patent and Trademark Office*